United States Patent [19]

Yamagishi

[11] Patent Number: 4,920,409
[45] Date of Patent: Apr. 24, 1990

[54] MATRIX TYPE COLOR LIQUID CRYSTAL DISPLAY DEVICE

[75] Inventor: Kooji Yamagishi, Oome, Japan

[73] Assignee: Casio Computer Co., Ltd., Tokyo, Japan

[21] Appl. No.: 209,422

[22] Filed: Jun. 20, 1988

[30] Foreign Application Priority Data

| Jun. 23, 1987 | [JP] | Japan | 62-96233[U] |
| Jun. 23, 1987 | [JP] | Japan | 62-96234[U] |
| Jul. 29, 1987 | [JP] | Japan | 62-115048[U] |
| Jul. 29, 1987 | [JP] | Japan | 62-115049[U] |
| Jul. 29, 1987 | [JP] | Japan | 62-115050[U] |

[51] Int. Cl.$^5$ ............................................. H04N 9/30
[52] U.S. Cl. ........................................ 358/56; 358/59; 350/333
[58] Field of Search .................. 350/333, 334; 358/56, 358/59

[56] References Cited

U.S. PATENT DOCUMENTS

| 3,731,986 | 5/1973 | Fergason | 350/150 |
| 3,918,796 | 11/1975 | Fergason | 350/160 LC |
| 3,935,590 | 1/1976 | Kaji et al. | 358/56 |
| 4,031,541 | 6/1977 | Arisawa et al. | 358/56 |
| 4,491,863 | 1/1985 | Kurahashi | 356/56 |
| 4,773,737 | 9/1988 | Yokono et al. | 350/333 |

FOREIGN PATENT DOCUMENTS

| 0050619 | 4/1977 | Japan | 358/59 |
| 59-55783 | 4/1984 | Japan . | |
| 59-222878 | 12/1984 | Japan . | |
| 60-26390 | 2/1985 | Japan . | |
| 0043635 | 3/1985 | Japan | 350/333 |
| 0207118 | 10/1985 | Japan | 350/333 |
| 2147733A | 5/1985 | United Kingdom | 358/56 |

Primary Examiner—James J. Groody
Assistant Examiner—Kim Yen Vu
Attorney, Agent, or Firm—Frishauf, Holtz, Goodman & Woodward

[57] ABSTRACT

A matrix type color liquid crystal display device includes a plurality of stripe-shaped common electrodes extending in a horizontal direction; a plurality of square-shaped segment electrodes positioned opposite to the stripe-shaped common electrodes; and wire lines for connecting these square-shaped segment electrodes along a vertical direction to form a plurality of segment electrode columns for displaying the same color pixels. One segment electrode column for displaying a red color pixel is commonly connected to the other segment electrode column for displaying a red color pixel by means of the wire lines for simultaneous segment-electrode driving operation. A plurality of segment electrodes for displaying different color pixels are aligned in the horizontal direction to form first and second segment electrode lines which are positioned parallel to each other with respect to a single common electrode. The first segment electrode line is positionally shifted with respect to the second segment electrode line by a ½ pitch of a single square-shaped segment electrode.

25 Claims, 8 Drawing Sheets

MATRIX TYPE COLOR LIQUID CRYSTAL DISPLAY DEVICE

BACKGROUND OF THE INVENTION

1. Field of the Invention

The present invention generally relates to a color liquid crystal display device. More specifically, the present invention is directed to a matrix type color liquid crystal display device capable of displaying a full-color image on a color liquid crystal device television.

2. Description of the Related Art

In the conventional color liquid crystal devices, two typical electrode patterns, as illustrated in FIGS. 1 and 2, have been proposed. These color liquid crystal devices are suitable for displaying a full-color image such as a television screen or the like.

The color liquid crystal display device shown in FIG. 1 is known as a so-called "stripe electrode type LCD (liquid crystal device)". This stripe electrode type color liquid crystal display device is constructed of; a large quantity of horizontal stripe-shaped common electrodes (also referred to as "scanning electrodes") C1, C2, C3, . . . , formed on one of a pair of transparent substrates which are positioned opposite to each other with sandwiching a liquid crystal layer (not shown in detail); and a large quantity of vertical stripe-shaped segment electrodes (also referred to as "signal electrodes") R1, R2, R3, . . . , formed on the other of the abovementioned pair of transparent substrates. These vertical stripe-shaped segment electrodes R1, G2, B3, . . . , are crossed with the horizontal stripe-shaped common electrodes C1, C2, C3, . . . . The first and fourth segment electrodes R1, R4 are allocated, for instance, to a segment electrode for displaying a red pixel, and red filters are formed on these segment electrodes R1 and R4. The second and fifth segment electrodes G2, G5 are allocated, for example, to a segment electrode for displaying a green pixel, and green filters are formed on these segment electrodes. The third and sixth segment electrodes are allocated, for instance, to a segment electrode for displaying a blue pixel, and blue filters are formed on these segment electrodes. It should be noted that the remaining segment electrodes (not shown in detail) are allocated to predetermined color-filtered segment electrodes. In FIG. 1, symbols X1, X2, . . . , represent terminals of the respective common electrodes C1, C2, . . . , whereas symbols Y1, Y2, Y3, . . . , indicate terminals of the corresponding segment electrodes R1, G2, B3, . . . .

Display operation of these stripe electrode type color liquid crystal display device is performed by sequentially driving these common electrodes C1, C2, . . . , and by selectively driving each of these segment electrodes R1, R2, R3, . . . , in synchronism with the driving operation of these common electrodes. The fullcolor display by the stripe electrode type color liquid crystal display device can be realized by combining three different pixels. That is, the red pixels which are displayed or illuminated on the intersecting portions between the red-filtered segment electrodes R1, R4, . . . , and common electrodes C1, C2, . . . , are combined with the green pixels which are displayed on the intersecting portions between the green-filtered segment electrodes G2, G5, . . . , and common electrodes C1, C2, . . . , and also the blue pixels which are displayed on the intersecting portions between the blue-filtered segment electrodes B3, B6, . . . , and the common electrodes C1, C2, . . . , respectively.

The color liquid crystal display device shown in FIG. 2 is so-called as a dot electrode type color liquid crystal display device. The dot electrode type color liquid crystal display device is arranged by: segment electrodes for displaying red pixels R1, R4, . . . ; segment electrodes for displaying green pixels G2, G5, . . . ; and segment electrodes for displaying blue pixels B3, B6, . . . , and similarly a number of common electrodes C1, C2, . . . . As is shown in FIG. 2, the respective segment electrodes are positioned in such a manner that a width of each of these segment electrodes in the vertical direction (viewed in the drawing) is selected to be an approximately ½ (a half of) width of each of these common electrodes C1, C2, . . . . In other words, these segment electrodes R1, G1, B1, . . . are positioned like a dot-shaped pattern. Also, these dot-shaped segment electrodes are aligned in upper and lower lines along the longitudinal direction of the respective common electrodes C1, C2, C3, . . . , i.e., in the horizontal direction as viewed in FIG. 2, in such a condition that one dot-shaped segment electrode, for instance, "R1" located in the upper line of the common electrode C1 is shifted by an approximately ½ pitch with respect to the other dot-shaped segment electrode, for example, "G2" positioned in the lower line thereof. That is, each of the dot-shaped segment electrodes positioned in the upper line of the respective common electrodes is alternately positioned with keeping a ½ positional shift with respect to each of the corresponding dot-shaped segment electrodes located in the corresponding lower line thereof. Moreover, the segment electrodes for displaying the same color pixel, e.g., "R1" positioned along the vertical direction, i.e., columns of the common electrodes C1, C2, C3, . . . , are commonly connected with each other via the segment electrodes for displaying the different color pixel, e.g.,"G2" by a signal line "a" and thus a segment electrode terminal Y1, Y2, or Y3. As a result, the color liquid crystal display device is formed as the dot-shaped electrodes for each segment electrode R1, G2, or B3 to display the desired color pixels in such a way that an approximately half portion of the respective dot-shaped segment electrodes is overlapped over another half portion of the corresponding dot-shaped segment electrodes along the vertical direction. This color liquid crystal display device is operated by sequentially driving the combined three different color pixels which are positioned in a triangle relationship, that is similar to the pixel driving operation, so as to display the full-color picture.

The stripe electrode type color liquid crystal display device shown in FIG. 1 has the following drawback. That is, since the stripe-shaped segment electrodes for displaying the color pixels R1, R4, . . . ; G2, G5, . . . ; and B3, B6 are alternately arranged as illustrated in FIG. 1, the same color pixels are aligned in the vertical direction although the three different color pixels, i.e., red, green and blue are alternately arranged or displayed. As a consequence, the color balance of this stripe electrode type color liquid crystal display device is deteriorated, but also red, green, and blue color strip patterns appear in the displayed image. Moreover, since the width of the respective color pixels are substantially equal to those of the respective common electrodes, namely, a pixel having a great area in the vertical direction, the individual color pixels appear considerably so that the image quality of the stripe electrode type color liquid crystal display device is lowered.

The dot electrode type color liquid crystal display device, on the other hand, overcomes, to some extent, the above-described color balance belonging to the stripe electrode type color liquid crystal display. This is because the respective color pixels of the segment electrodes R1, R4, . . . ; G2, G5, . . . ; B3, B6, . . . are alingned in both upper and lower lines of the corresponding common electrodes C1, C2, . . . under the condition that each of the segment electrodes located in the upper line is shifted by a ½ pitch with respect to the corresponding segment electrodes positioned in the lower line. Similarly, this dot electrode type color liquid crystal display device shown in FIG. 2 overcomes the stripe pattern appearance of the same color pixels, viewed in the vertical direction, as compared with that of the stripe electrode type color liquid crystal display device, because the same color pixels aligned in the vertical direction are spaced with each other at an approximately ½ interval of the full width of the common electrode in the vertical direction. Although the width of the respective segment electrodes R1, G2, B3, . . . , in the vertical direction is narrower than that of the common electrode, i.e., an approximately half of the full width of the common electrode, another width of the segment electrodes in the horizontal direction is approximately two times greater than the width thereof in the vertical direction (in case that the screen size and the column number of the segment electrodes are the same). As a result, the following similar appearance problem of the displayed color pixels is provided as in the stripe electrode type color liquid crystal display device. That is, the respective color pixels of the dot electrode type color liquid crystal display device can be recognized as such color pixels of the stripe electrode type color liquid crystal display device, which are inclined at a right angle with having the same size.

If the column number of the segment electrodes is furthermore increased and the widths of the respective segment electrodes R1, G2, B3, . . . are made narrow of the above-described conventional dot electrode type color liquid crystal display device, then the image quality may be increased while each of the color pixels does not particularly appear. However, if so, then other different problems may be provided. That is, since the respective columns of the segment electrodes R1, G2, B3 . . . , are separately driven in the conventional dot electrode type color liquid crystal display device, the large-scaled segment driver circuit is necessarily required when the column number of the segment electrodes is increased so as to make the horizontal widths of the respective segment electrodes R1, G2, B3, . . . , narrow. In addition, the sampling frequency of the picture signal must be selected to be higher than that of the normal-scaled dot electrode type color liquid crystal display device. This implies that to set the higher sampling frequency, the expensive, high performance circuit elements are required to construct the entire circuit, and the higher power consumption is needed.

SUMMARY OF THE INVENTION

The present invention has been accomplished in an attempt to solve the above-described conventional drawbacks. It is therefore an object of the invention to provide a novel matrix type color liquid crystal display device.

Another object of the invention is to provide a matrix type color liquid crystal display device wherein substantially no stripe pattern is observed. This stripe pattern is formed such that the same color pixels aligned in the direction intersecting the common electrode, which appears in the conventional dot electrode type color liquid crystal display device.

Still another object of the invention is to provide a matrix type color liquid crystal display device wherein the color balance is improved without setting the higher sampling frequency, as compared to such a conventional dot electrode type color liquid crystal display device wherein a number of segment electrodes are employed, the sizes of the color pixels are made small, and the higher density of the small color pixels is designed.

A further object of the invention is to provide a matrix type color liquid crystal display device wherein each of the color pixels does not particularly appear in the displayed image.

These objects of the present invention are accomplished by providing: a matrix type color liquid crystal display device comprising: a plurality of stripe-shaped common electrodes having a long edge extending along a horizontal direction, and also a short edge extending along a vertical direction perpendicular to the horizontal direction; a plurality of substantially square-shaped segment electrodes for displaying at least three different color pixels, positioned opposite to said plurality of stripe-shaped common electrodes so as to form a matrix pattern, a width of each of said segment electrodes along the vertical direction being equal to approximately a half of said short edge of each of said common electrodes, and said segment electrodes being aligned along first and second lines, which are positioned parallel to each other along the horizontal direction, with respect to each of said common electrodes under the condition that said segment electrodes arranged in said first line are positionally shifted by a predetermined positional shift amount with respect to said segment electrodes arranged in said second line, and also said segment electrodes for displaying said color pixels are aligned along the vertical direction; signal lines connected to said segment electrodes for displaying the same color pixels with each other along the vertical direction through said segment electrodes for displaying the different color pixels, and supplying drive signals thereto, thereby forming segment electrode columns for the same color pixels and different color pixels; and, connection lines for connecting said segment electrode columns for displaying the same color pixels, which are positioned adjacent to each other in the vertical direction, so as to form one pair of said adjoining segment electrode columns with sandwiching said segment electrode columns for displaying the different color pixels among said segment electrode columns connected by said signal lines, said one-paired segment electrode columns being simultaneously energized via said connection lines and signal lines.

With these constructions, no stripe pattern caused by the same color pixels which are aligned across the common electrodes, of the conventional dot electrode type color liquid crystal display device, is observed in the matrix type color liquid crystal display device according to the invention. Since the column number of the segment electrodes can be increased without setting the higher sampling frequency and also with having the smaller-scaled segment driver circuit, the sizes of the color pixels are made small, and the density of the color pixels are made high, the better color balance than that of the conventional dot electrode type color liquid crystal display device can be achieved. Moreover, no particular color pixel can be observed, resulting in the improved image quality.

BRIEF DESCRIPTION OF THE DRAWINGS

For a better understanding of these and other objects of the present invention, reference is made to the following detailed description of the invention to be read in conjunction with the following drawings, in which.

DETAILED DESCRIPTION OF THE PREFERRED EMBODIMENT GENERAL DESCRIPTION OF COLOR LIQUID CRYSTAL DISPLAY DEVICE

In the following descriptions and drawings of the preferred embodiments according to the invention, neither construction of the liquid crystal cell, nor cell driver circuit is described, or shown since these construction and cell driver circuit are per se known in this technical field. For instance, the twisted nematic type liquid crystal display device is described in U.S. Pat. No. 3,918,796 to Fergason, entitled "LIQUIDCRYSTAL NON-LINEAR LIGHT MODULATORS USING ELECTRIC AND MAGNETIC FIELDS", and U.S. Pat. No. 3,731,986 also to Fergason, entitled "DISPLAY DEVICES UTILIZING LIQUID CRYSAL LIGHT MODULATION". The matrix type color liquid crystal display device according to the invention may be driven by these known cell driver circuit, and also may be utilized instead of the known twisted nematic type color LCD. Therefore, no further description is made in the specification.

It should be noted that a horizontal direction in the respective FIGS. 3 through 8 and 10 is defined by a "Y" direction, or a line direction, whereas a vertical direction therein is denoted by an "X" direction, or a column direction.

It should be also noted that for the sake of simplicity, only a portion of the matrix type electrode patterns according to the invention is illustrated in FIGS. 3 to 8 and 10.

CONSTRUCTION OF FIRST MATRIX TYPE ELECTRODE PATTERN

Figure 1:
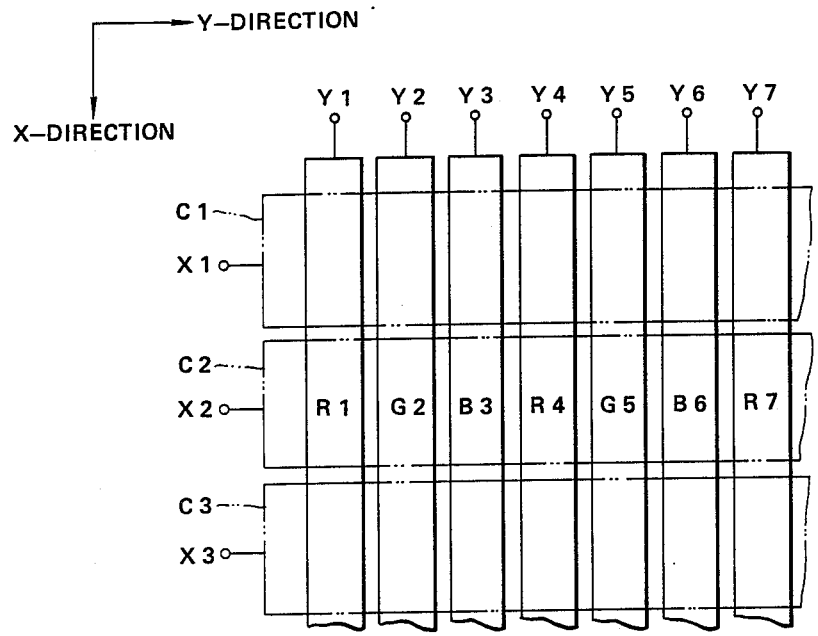
FIGS. 1 and 2 schematically illustrate electrode patterns of the conventional stripe and dot electrode type color liquid crystal display devices, respectively.
Figure 2:
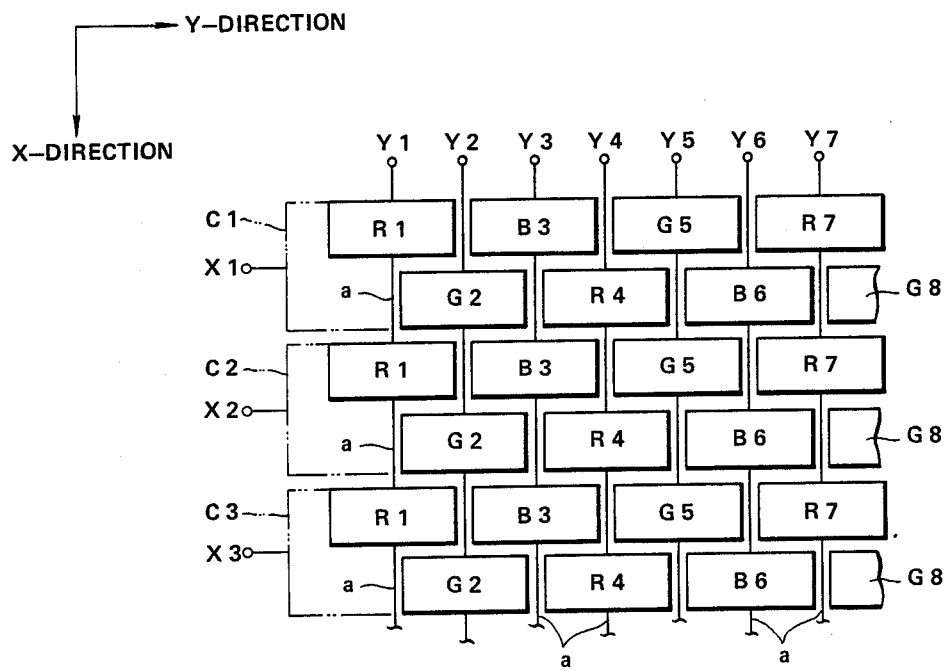
Figure 3:
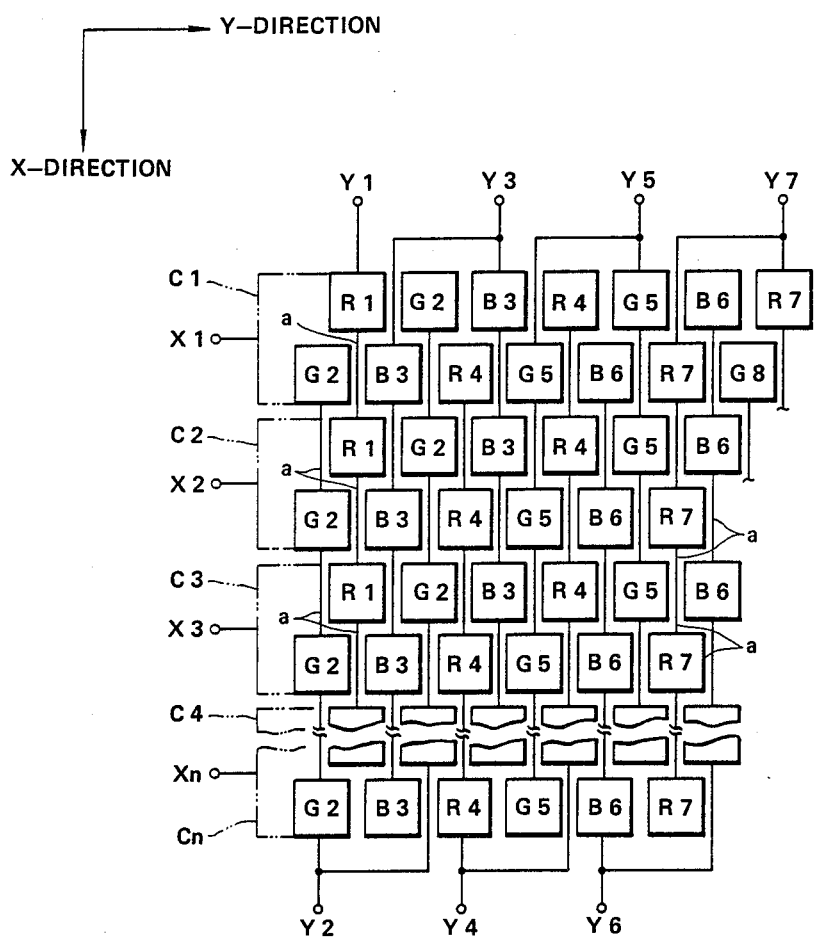
FIG. 3 schematically illustrates an electrode pattern of a matrix type color liquid crystal display device according to a first preferred embodiment of the present invention.

Referring now to FIG. 3, a matrix type electrode pattern of a color liquid crystal display device according to a first preferred embodiment of the invention will be described in detail.

The matrix type color liquid crystal display device, shown in FIG. 3, is constructed of: a large quantity of horizontal stripe-shaped common electrodes $C_1$, $C_2$, $C_3$, ..., $C_n$ ("n" being a predetermined integer) having common electrode terminals $X_1$, $X_2$, ..., $X_n$ ("n" being also a predetermine integer); a number of segment electrodes $R_1$, $R_4$, $G_2$, $G_4$, $B_3$, $B_6$, ..., positioned opposite to the respective common electrodes $C_1$, $C_2$, ..., $C_n$ and having segment electrode terminals $Y_1$, $Y_2$, $Y_3$, .... The common electrodes $C_1$, $C_2$, ..., $C_n$ extend along the Y direction, or line direction, whereas the segment electrodes $R_1$, $G_2$, $B_3$, ... extend along the X direction, or column direction of the matrix pattern. The segment electrodes indicated by $R_1$, $R_4$, ..., $R_n$ ("n" being a predetermine integer) are allocated to display a first color pixel among three primary colors such as red, green and blue, e.g., the red pixel in the preferred embodiment. Similarly, the segment electrodes represented by $G_2$, $G_5$, ..., $G_n$ ("N" being a predetermine integer) are allocated to display a second color pixel, e.g., the green pixel in the preferred embodiment, whereas the segment electrodes defined by $B_3$, $B_6$, ..., $B_n$ ("n" being a predetermine integer) are allocated to display a third color pixel, e.g., the blue pixel in the preferred embodiment. These segment electrodes for displaying red, green and blue pixels $R_1$, $R_4$, $G_2$, $G_5$, $B_3$, $B_6$, ..., $R_n$, $G_n$ and $B_n$ are so constructed that red, green, and blue color filters are formed on surfaces of transparent electrodes, and shaped in square dot-shaped electrodes. That is, a width of each dot-shaped electrode $R_1$, $G_2$, and $B_3$ in the X direction (column direction) is equal to approximately a half width of each common electrode $C_1$, $C_2$, ..., $C_n$, and another width of each dot-shaped electrode in the Y direction (line direction) is selected to be approximately the vertical width of the dot-shaped electrode in the X direction. In other words, the shape of this dot-shaped segment electrode is a square having an aspect ratio of 1:1, approximately. These dot-shaped segment electrodes $R_1$, $G_2$, $B_3$, ..., $R_n$, $G_n$ and $B_n$ are aligned in both upper and lower lines with respect to the respective common electrodes $C_1$, $C_2$, ..., $C_n$ along the horizontal (X) direction. The dot-shaped segment electrodes located along the upper line of the corresponding common electrode are positionally shifted by a ½ pitch to the dot-shaped segment electrodes positioned along the lower line thereof. Namely, these dot-shaped square segment electrodes $R_1$, $G_2$, $B_3$, ..., $R_n$, $G_n$ and $B_n$ are arranged in a zig-zag line along the horizontal direction.

On the other hand, the dot-shaped square segment electrodes for displaying the same color pixels, e.g., "R1", "B3", and "R6" positioned along the respective columns (X direction) are connected to each other via the segment electrodes for displaying the different color pixels, e.g., "G2", "R4", and "G5" by means of signal lines "a". One pair of two segment electrode columns for displaying the same color pixel are commonly connected to each other in such a manner that one segment electrode column for displaying the same color pixel, e.g., "B3" extends directly adjacent the segment electrode column for displaying the different color pixel, i.e., "G2" in the preferred embodiment. That is, one segment electrode column "G2" is connected to the other segment electrode column "G2" to form one-paired segment electrode column, and, one segment electrode column "R4" is connected to the other segment electrode column "R4" to form one-paired segment electrode column. These paired segment electrode columns are connected to the corresponding segment electrode terminals Y2, Y3, Y4, . . . , Yn ("n" being a predetermine integer).

It should be noted that the first segment electrode column, i.e., segment electrode column "R1" is solely connected to the first segment electrode terminal "Y1", and also the above-described segment electrode terminals Y1, Y2, Y3, . . . , Y7 are alternately arranged in both the upper and lower sides of the matrix type color liquid crystal display device not to intersect the common connecting lines "a" with each other.

With the above-described arrangements, the matrix type electrode pattern of the color liquid crystal display device according to the first preferred embodiment can be constructed with having the specific pattern of the square dot-shaped segment electrodes in combination with the common electrodes.

DRIVING OPERATION OF FIRST MATRIX TYPE COLOR LCD

The matrix type color liquid crystal display device employing the square dot-shaped segment electrodes according to the first preferred embodiment will now be driven under the following conditions. The common electrodes C1, C2, . . . , Cn arranged along the Y, or vertical direction are sequentially driven, and the segment drive signals are selectively applied to the corresponding segment electrode terminals Y1, Y2, Y3, . . . , Yn in synchronism with the driving operation of the common electrodes, with the result that the full-color image can be displayed on the matrix type color liquid crystal display device shown in FIG. 3. This full-color image is displayed, according to the first preferred embodiment, by driving six-combined segment electrodes in such a manner that these combinations are selected from the segment electrodes R1, G2 G2, B3, B3, R4 (located in the lower line in FIG. 3) which are driven by supplying the drive signal to the segment electrode terminals Y1, Y2, Y3, and Y4, and from the segment electrodes R4 (positioned in the upper line in FIG. 3), G5, G5, B6, B6, and R7 (positioned in the lower line in FIG. 3) which are driven by supplying the drive signal to the segment electrode terminals Y4, Y5, Y6 and Y7. It should be noted that since the segment electrodes for displaying the red pixels R4, R7, . . . , except for the segment electrode for displaying the red pixel "R1" are positioned on both six groups of the adjoining segment electrodes, when one group of the segment electrodes for displaying the red pixels R4, R7, . . . , is driven, the adjoining group of the segment electrodes for displaying the red pixels R4, R7 is driven in conjunction with the first-mentioned segment electrode group. Accordingly, although these red pixels of the segment electrodes are illuminated, the red pixels displayed in the adjoining electrode groups are very small and thus are not substantially observed, because both the vertical and horizontal widths of the respective segment electrodes R1, G2, B3, R4, . . . , of the matrix type color liquid crystal display device are designed to be equal to an approximately half width of the common electrode in the vertical (X) direction.

As previously described, in the matrix type color liquid crystal display device according to the first preferred embodiment, the segment electrodes for displaying the red pixels R1, R4, . . . , the segment electrodes for displaying the green pixels G2, G5, . . . , and the segment electrodes for displaying the blue pixels B3, B6, . . . , are formed as the square dot-shaped electrodes which has an about half width of a vertical width of one common electrode. Also these segment electrodes for displaying the red, green, and blue pixels are aligned in both upper and lower lines of the corresponding common electrodes under the condition that the segment electrodes positioned in the upper line are positionally shifted by a ½ pitch with respect to those in the lower line. As a result, such stripe patterns that the same color pixels arranged in the direction (i.e., vertical direction) normal to the longitudinal direction (i.e., horizontal direction) are continued while displayed, are no longer emphasized, which is similar to the conventional dot electrode type color liquid crystal display device.

In addition to the above-described particular advantage of the first preferred embodiment, both the segment electrode columns for displaying the same color pixels, which are positioned in the column (vertical) direction directly adjacent the segment electrode column for displaying the different color pixel, are commonly connected to each other by way of the signal lines "a" and "a" so as to form one pair of the segment electrode columns to display the same color pixel. Then, these two segment electrode columns are simultaneously driven in the first preferred embodiment, so that the following advantages thereof can be achieved. That is, since the number of the segment electrode column which can be driven by the same circuit-scaled segment driver circuit under the same sampling frequency, becomes approximately two times greater than that of the single-driven segment electrode column, the horizontal widths of the respective segment electrodes R1, G2, B3, . . . , Rn, Gn and Bn can be made approximately ½. As a consequence, in the matrix type color liquid crystal display device according to the first preferred embodiment, the number of the segment electrode columns can be increased without employing the large-scaled segment driver circuit under the higher sampling frequency, and furthermore the sizes of the color pixels can be made small and thus the higher density of the color pixels can be achieved. Therefore, the color balance of the matrix type color liquid crystal display device can be considerably improved, as compared with the conventional dot electrode type color liquid crystal display device, and moreover, the image quality of the displayed image by the matrix type color liquid crystal display device can be increased with maintaining no particular appearance of the specific color pixel.

MODIFIED FIRST MATRIX TYPE COLOR LCD

In the above-described preferred embodiment, the first color pixel was selected to be red, the second color pixel was selected to be green, and the third color pixel was selected to be blue. It is, of course, possible to select different color combinations other than the above-described RGB color combination, for instance, cyan, orange and magenta color combination. Moreover, the common connection by the signal lines "a" was performed for the segment electrode columns within the matrix-shaped dot electrode patterns in the first preferred embodiment. The present invention is not limited to this common connection system. For instance, each of the segment electrode columns may be directly connected to the individual segment driver circuit, and these segment electrode columns may be commonly connected to each other within the segment driver circuit.

Since the horizontal widths of the respective segment electrodes R1, G2, B3, ..., Rn, Gn and Bn are determined by the LCD screen size and the number of the color pixels in the horizontal direction, namely, the number of the segment electrode columns, the aspect ratio of a certain segment electrode is not set to the above-described 1:1, i.e., a square shape, depending upon the number of the color pixels. Even if the matrix type color LCD contains a small number of the segment electrodes having a different aspect ratio from 1:1, merely the shapes of these segment electrodes are slightly changed, but the specific advantages of the invention, i.e., the color balance and no particular appearance of the specific color pixel can be maintained. Although the respective color filters were formed on the surfaces of the corresponding segment electrodes R1, G2, B3, ..., Rn, Gn and Bn in the first preferred embodiment, these color filters may be formed under the corresponding segment electrodes. Otherwise, these color filters may be formed at the common electrode side, or the outer surfaces of the pixels, and positioned opposite to the corresponding segment electrodes.

Also, the positional shift between the segment electrodes located in both the upper and lower lines may be properly determined from approximately 0 pitch to approximately 1 pitch of a single electrode width.

CONSTRUCTION OF SECOND MATRIX TYPE ELECTRODE PATTERN

A matrix type electrode pattern of a color liquid crystal display device according to a second preferred embodiment of the invention will now be described with reference to FIG. 4.

Figure 4:
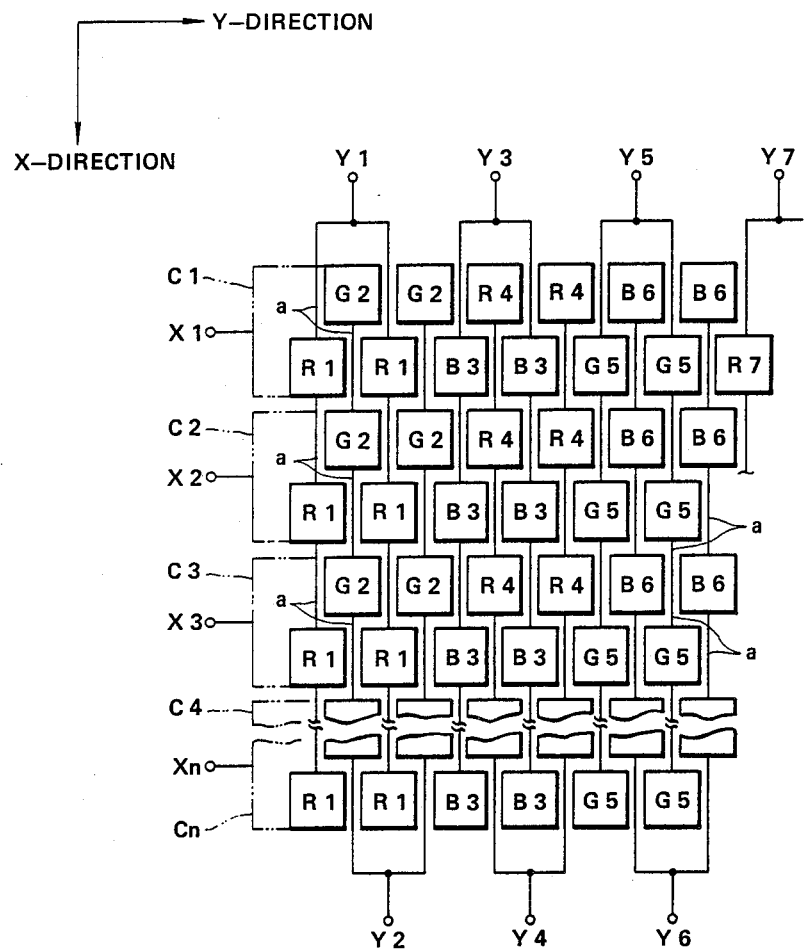
FIG. 4 schematically illustrates an electrode pattern of the matrix type color LCD (liquid crystal device) according to a second preferred embodiment of the invention.

The matrix type color liquid crystal display device, shown in FIG. 4, is constructed of: a large quantity of horizontal stripe-shaped common electrodes C1, C2, C3, ..., Cn ("n" being a predetermined integer) having common electrode terminals X1, X2, ..., Xn ("n" being also a predetermined integer); a number of segment electrodes R1, R4, G2, G5, B3, B6, ..., positioned opposite to the respective common electrodes C1, C2, ..., Cn and having segment electrode terminals Y1, Y2, Y7, .... The common electrodes C1, C2, ..., Cn similarly extend along the Y direction, or line direction, whereas the segment electrodes R1, G2, B3, ... extend along the X direction, or column direction of the matrix pattern. The segment electrodes indicated by R1, R4, ..., Rn ("n" being a predetermined integer) are allocated to display a first color pixel among three primary colors such as red, green and blue, e.g., the red pixel in the preferred embodiment. Similarly, the segment electrodes represented by G2, G5, ..., Gn ("n" being a predetermined integer) are allocated to display a second color pixel, e.g., the green pixel in the preferred embodiment, whereas the segment electrodes defined by B3, B6, ..., Bn ("n" being a predetermined integer) are allocated to display a third color pixel, e.g., the blue pixel in the preferred embodiment. These segment electrodes for displaying red, green and blue pixels R1, R4, G2, G5, B3, B6, ..., Rn, Gn and Bn are so constructed that red, green and blue color filters are formed on surfaces of transparent electrodes, and shaped in square dot-shaped electrodes. That is, a width of each dot-shaped electrode R1, G2, and B3 in the X direction (column direction) is equal to approximately a half width of each common electrode C1, C2, ..., Cn, and another width of each dot-shaped electrode in the Y direction (line direction) is selected to be approximately the vertical width of the dot-shaped electrode in the X direction. In other words, the shape of this dot-shaped segment electrode is a square having an aspect ratio of 1:1, approximately. These dot-shaped segment electrodes R1, G2, B3, ..., Rn, Gn and Bn are aligned in both upper and lower lines with respect to the respective common electrodes C1, C2, ..., Cn along the horizontal (Y) direction. The dot-shaped segment electrodes located along the upper line of the corresponding common electrode are positionally shifted by a ½ pitch of a single segment electrode to the dot-shaped segment electrodes positioned along the lower line thereof. Namely, these dot-shaped square segment electrodes R1, G2, B3, ..., Rn, Gn and Bn are arranged in a zig-zag line along the horizontal direction.

The feature of the second preferred embodiment is that the arrangement order of the segment electrodes positioned in the upper line along the Y-direction is repeatedly selected to the segment electrode for displaying the green pixel "G2" - the segment electrode for displaying the green pixel "G2" - the segment electrode for displaying the red pixel "R4" - the segment electrode for displaying the red pixel "R4" the segment electrode for displaying the blue pixel "B6" - the segment electrode for displaying the blue pixel "B6". Similarly, the arrangement order of the segment electrodes positioned in the lower line along the Y-direction is repeatedly selected to the segment electrode for displaying the red pixel "R1" - the segment electrode for displaying the red pixel"R1" - the segment electrode for displaying the blue pixel "B3" - the segment electrode for displaying the blue pixel "B3" - the segment electrode for displaying the green pixel "G5" - the segment electrode for displaying the green pixel "G5". The segment electrodes for displaying the same color pixels aligned in a direction intersecting the longitudinal direction of the common electrodes C1, C2, ..., Cn, namely in the vertical (column) direction, are connected to each other by means of the signal lines "a" and "a" passing through the corresponding segment electrodes for displaying the different color pixels. For instance, one segment electrode "R1" is connected to the other segment electrode "R1" in the vertical direction, one segment electrode "G2" is connected to the other segment electrode "G2", and similarly one segment electrode "B3" is connected to the other segment electrode "B3".

One pair of two segment electrode columns for displaying the same color pixel which are positioned ajacent to each other in the column direction are commonly connected to each other in such a manner that one segment electrode column for displaying the same color pixel, e.g. "B3" is connected to the other segment electrode column for displaying the same color pixel, i.e., "B3" in the preferred embodiment. That is, one segment electrode column "R1" is connected to the other segment electrode column "R1" to form one-paired segment electrode columns; and, one segment electrode column "G2" is connected to the other segment electrode column "G2" to form one-paired segment electrode columns. These paired segment electrode columns are connected to the corresponding segment electrode terminals Y1, Y2, Y3, Y4, ..., Yn ("n" being a predetermined integer).

It should be noted that the above-described segment electrode terminals Y1, Y2, Y3, ..., Y7 are alternately arranged in both the upper and lower sides of the matrix type color liquid crystal display device not to intersect the common connecting lines "a" with each other.

With the above-described arrangements, the matrix type electrode pattern of the color liquid crystal display device according to the first preferred embodiment can be constructed with having the specific pattern of the square dot-shaped segment electrodes in combination with the common electrodes.

DRIVING OPERATION OF SECOND MATRIX TYPE COLOR LCD

The matrix type color liquid crystal display device employing the square dot-shaped segment electrodes according to the second preferred embodiment will now be driven under the following conditions. The common electrodes C1, C2, ..., Cn arranged along the Y, or vertical direction are sequentially driven, and the segment drive signals are selectively applied to the corresponding segment electrode terminals Y1, Y2, Y3, ..., Yn in synchronism with the driving operation of the common electrodes, with the result that the full-color image can be displayed on the matrix type color liquid crystal display device shown in FIG. 4. This full-color image is displayed, according to the second preferred embodiment, by driving six-combined segment electrodes in such a manner that these combinations are selected from the segment electrodes R1, R1, G2, G2, B3, and B3 which are driven by supplying the drive signal to the segment electrode terminals Y1, Y2, and Y3, and from the segment electrodes R4, R4, G5, G5, B6, and B6, which are driven by supplying the drive signal to the segment electrode terminals Y4, Y5, Y6 and Y7.

As previously described, in the matrix type color liquid crystal display device according to the second preferred embodiment, the segment electrodes for displaying the red pixels R1, R4, ..., the segment electrodes for displaying the green pixels G2, G5, ..., and the segment electrodes for displaying the blue pixels B3, B6, ..., are formed as the square dot-shaped electrodes which has an about half width of a vertical width of one common electrode. Also these segment electrodes for displaying the red, green, and blue pixels are alinged in both upper and lower lines of the corresponding common electrode under the condition that the segment electrodes positioned in the upper line are positionally shifted by a ½ pitch of a single segment electrode with respect to those in the lower line. As a result, such stripe patterns that the same color pixels arranged in the direction (i.e., vertical direction) normal to the longitudinal direction (i.e., horizontal direction) are continued while displayed, are no longer emphasized, which is similar to the conventional dot electrode type color liquid crystal display device. Since the respective segment electrodes for displaying the respective color pixels R1, G2, B3, ..., are arranged in the above-described order along the horizontal direction the color balance established by the red, green, and blue color pixels can be improved. In addition, according to the second matrix type color liquid crystal display device, the adjoining segment electrode columns for displaying the same color pixels among the respective segment electrode columns connected by the signal lines "a" and "a" are combined to form one-paired segment electrode columns. Then, the one-paired segment electrode columns are simultaneously driven in the second preferred embodiment, so that the following advantages thereof can be achieved. That is, the number of the segment electrode column which can be driven by the same circuit-scaled segment driver circuit under the same sampling frequency, becomes approximately two times greater than that of the single-driven segment electrode column. As a consequence, in the matrix type color liquid crystal display device according to the second preferred embodiment, the number of the segment electrode columns can be increased without employing the large-scaled segment driver circuit under the higher sampling frequency, and furthermore the horizontal widths of the color pixels can be made small and thus the higher density of the color pixels can be achieved. Therefore, the color balance of the matrix type color liquid crystal display device can be considerably improved, as compared with the conventional dot electrode type color liquid crystal display device, and moreover, the image quality of the displayed image by the matrix type color liquid crystal display device can be increased with maintaining no particular appearance of the specific color pixel.

Since the matrix type color LCD according to the second preferred embodiment may be modified based upon the modifications described in the first preferred embodiment, no further detailed explanation is done for the sake of the simplicity.

CONSTRUCTION OF THIRD MATRIX TYPE ELECTRODE PATTERN

Figure 5:
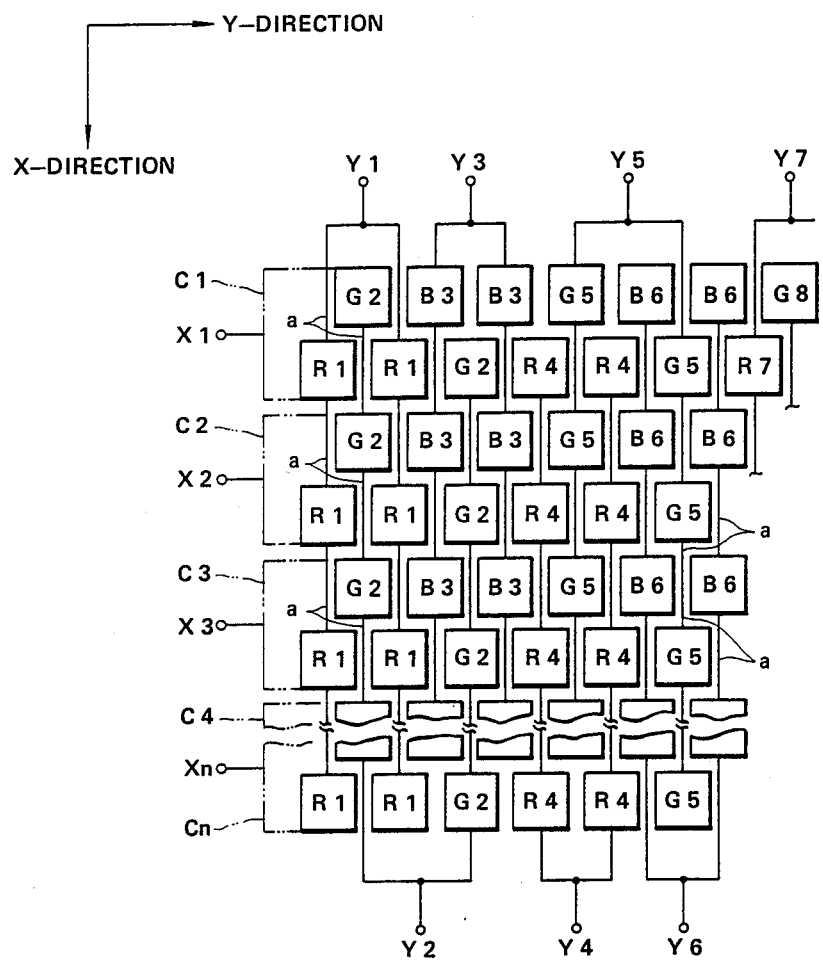
FIG. 5 schematically illustrates an electrode pattern of the matrix type color LCD according to a third preferred embodiment of the invention.

Referring now to FIG. 5, a matrix type electrode pattern of a color liquid crystal display device according to a third preferred embodiment of the invention will be described in detail.

The matrix type color liquid crystal display device, shown in FIG. 5, is similarly constructed of: a large quantity of horizontal stripe-shaped common electrodes C1, C2, C3, ..., Cn ("n" being a predetermined integer) having common electrode terminals X1, X2, ..., Xn ("n" being also a predetermined integer); a plenty of segment electrodes R1, R4, G2, G5, B3, B6, ..., positioned opposite to the respective common electrodes C1, C2, ..., Cn and having segment electrode terminals Y1, Y2, Y7, .... The common electrodes C1, C2, ..., Cn extend along the Y direction, or line direction, whereas the segment electrodes R1, G2, B3, ... extend along the X direciton, or column direciton of the matrix pattern. That is, the segment electrode column intersects the common electrode line at a right angle. The segment electrodes indicated by R1, R4, ..., Rn ("n" being a predetermined integer) are allocated to display a first color pixel among three primary colors such as red, green and blue, e.g., the red pixel in the preferred embodiment. Similarly, the segment electrodes represented by G2, G5, ..., Gn ("n" being a predetermined integer) are allocated to display a second color pixel, e.g., the green pixel in the preferred embodiment, whereas the segment electrodes defined by B3, B6, ..., Bn ("n" being a predetermined integer) are allocated to display a third color pixel, e.g., the blue pixel in the preferred embodiment. These segment electrodes for displaying red, green and blue pixels R1, R4, G2, G4, B3, B6, ..., Rn, Gn and Bn are so constructed that red, green, and blue color filters are formed on surfaces of transparent electrodes, and shaped in square dot-shaped electrodes R1, G2, and B3 in the X direction (column direction) is equal to approximately a half width of each common electrode C1, C2, ..., Cn, and another width of each dot-shaped electrode in the Y direction (line direction) is selected to be approximately the vertical width of the dot-shaped electrode in the X direction. In other words, the shape of this dot-shaped segment electrode is a square having an aspect ratio of 1:1, approximately. These dot-shaped segment electrodes R1, G2, B3, ..., Rn, Gn and Bn are alinged in both upper and lower lines with respect to the respective common electrodes C1, C2, ..., Cn along the horizontal (X) direction. The dot-shaped segment electrodes located along the upper line of the corresponding common electrode are positionally shifted by a ½ pitch of a single segment electrode to the dot-shaped segment electrodes positioned along the lower line thereof. Namely, these dot-shaped square segment electrodes R1, G2, B3, ..., Rn, Gn and Bn are arranged in a zig-zag line along the horizontal direction.

The feature of the third preferred embodiment is that the arrangement order of the segment electrodes positioned in the upper line along the Y-direction is repeatedly selected to the segment electrode for displaying the green pixel "G2" - the segment electrode for displaying the blue pixel "B3" - the segment electrode for displaying the green pixel "G5" - the segment electrode for displaying the blue pixel "B6" - the segment electrode for displaying the blue pixel "B6". Similarly, the arrangement order of the segment electrodes positioned in the lower line along the Y-direction is repeatedly selected to the segment electrode for displaying the red pixel "R1" - the segment electrode for displaying the red pixel "R1" -the segment electrode for displaying the green pixel "G2" - the segment electrode for displaying the red pixel "R4" - the segment electrode for displaying the red pixel "R4" - the segment electrode for displaying the green pixel "G5". The segment electrodes for displaying the same color pixels aligned in a direction intersecting the longitudinal direction of the common electrodes C1, C2, ..., Cn, namely in the vertical (column) direction, are connected to each other by means of the signal lines "a" and "a" passing through the corresponding segment electrodes for displaying the different color pixels. For instance, one segment electrode 37 R1" is directly connected to the other segment electrode "R1" in the vertical direction, one segment electrode "G2" is directly connected to the other segment electrode "G2", and similarly one segment electrode "B3" is directly connected to the other segment electrode "B3". Otherwise, one segment electrode, for instance, "R1" is connected to the other segment electrode "R1" via the segment electrode for displaying the different color pixel, e.g., "G2" which is sandwiched between these segment electrodes "R1" and "R1". These paired segment electrode columns are connected to the corresponding segment electrode terminals Y1, Y2, Y3, Y4, ..., Yn ("n" being a predetermined integer).

It should be noted that the above-described segment electrode terminals Y1, Y2, Y3, ..., Y7 are alternately arranged in both the upper and lower sides of the matrix type color liquid crystal display device not to intersect the common connecting lines "a" with each other.

With the above-described arrangements, the matrix type electrode pattern of the color liquid crystal display device according to the third preferred embodiment can be constructed to have the specific pattern of the square dot-shaped segment electrodes in combination with the common electrodes.

DRIVING OPERATION OF THIRD MATRIX TYPE COLOR LCD

The matrix type color liquid crystal display device employing the square dot-shaped segment electrodes according to the third preferred embodiment will now be driven under the following conditions. The common electrodes C1, C2, ..., Cn arranged along the X, or vertical direction are sequentially driven, and the segment drive signals are selectively applied to the corresponding segment electrode terminals Y1, Y2, Y3, ..., Yn in synchronism with the driving operation of the common electrodes, with the result that the full-color image can be displayed on the matrix type color liquid crystal display device shown in FIG. 5. This full-color image is displayed, according to the third preferred embodiment, by driving six-combined segment electrodes in such a manner that these combinations are selected from the segment electrodes R1, R1, G2, G2, B3, and B3 which are driven by supplying the drive signal to the segment electrode terminals Y1, Y2, and Y3, and from the segment electrodes R4, R4, G5, G5, B6, and B6, which are driven by supplying the drive signal to the segment electrode terminal Y4, Y5, Y6 and Y7. In other words, the full-color image is displayed by combining one paired red, green, and blue pixels, i.e., 6 color pixels consisting of three different color paired pixels.

As previously described, in the matrix type color liquid crystal display device according to the second preferred embodiment, the segment electrodes for displaying the red pixels R1, R4, ..., the segment electrodes for displaying the green pixels G2, G5, ..., and the segment electrodes for displaying the blue pixels B3, B6, ..., are formed as the square dot-shaped electrodes which has an about half width of a vertical width of one common electrode. Also these segment electrodes for displaying the red, green, and blue pixels are aligned in both upper and lower lines of the corresponding common electrode under the condition that the segment electrodes positioned in the upper line are positionally shifted by a ½ pitch of a single segment electrode with respect to those in the lower line. As a result, such stripe patterns that the same color pixels arranged in the direction (i.e., vertical direction) normal to the longitudinal direction (i.e., horizontal direction) are continued while displayed, are not perceptible, which is similar to the conventional dot electrode type color liquid crystal display device. In addition, according to the third matrix type color liquid crystal display device, the adjoining segment electrode columns for displaying electrode columns connected by the signal lines "a" and "a" are combined to form one-paired segment electrode columns. Then, the one-paired segment electrode columns are simultaneously driven in the third preferred embodiment, so that the following advantages thereof can be achieved. That is, the number of the segment electrode columns which can be driven by the same circuit-scaled segment driver circuit under the same sampling frequency, becomes approximately two times greater than that of the single-driven segment electrode column. As a consequence, in the matrix type color liquid crystal display device according to the third preferred embodiment, the number of the segment electrode columns can be increased without employing the large-scaled segment driver circuit under the higher sampling frequency, and furthermore the horizontal widths of the color pixels can be made small and thus the higher density of the color pixels can be achieved. As a result, the individual color pixels are no longer perceptible. Therefore, the color balance of the matrix type color liquid crystal display device established by these segment electrodes R1, G2, B3, . . . arranged in such an order can be considerably improved as compared with the conventional dot electrode type color liquid crystal display device, and moreover, the image quality of the displayed image by the matrix type color liquid crystal display device can be increased with maintaining no particular appearance of the specific color pixel.

Since the matrix type color LCD according to the third preferred embodiment may be modified based upon the modifications described in the first preferred embodiment, no further detailed explanation is done for the sake of the simplicity.

CONSTRUCTION OF FOURTH MATRIX TYPE ELECTRODE PATTERN

A matrix type electrode pattern of a color liquid crystal display device according to a fourth preferred embodiment of the invention will now be described with reference to FIG. 6.

Figure 6:
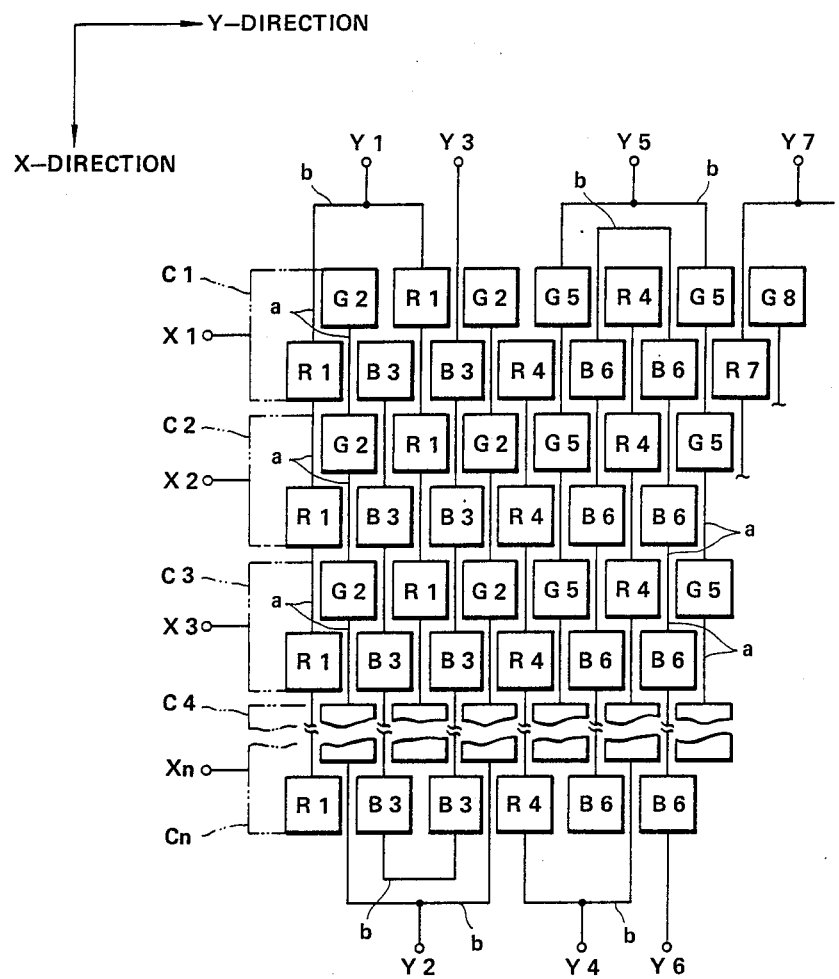
FIG. 6 schematically illustrates an electrode pattern of the matrix type color LCD according to a fourth preferred embodiment of the invention.

The matrix type color liquid crystal display device, shown in FIG. 6, is constructed of: a large quantity of horizontal stripe-shaped common electrodes C1, C2, C3, . . . , Cn ("n" being a predetermined integer) having common electrode terminals X1, X2, . . . , Xn ("n" being also a predetermined integer); a number of segment electrodes R1, R4, G2, G5, B3, B6, . . . , positioned opposite to the respective common electrodes C1, C2, . . . , Cn and having segment electrode terminals Y1, Y2, Y7, . . . . The horizontal stripe-shaped common electrodes C1, C2, . . . , Cn similarly extend along the Y direction, or line direction, whereas the segment electrodes R1, G2, B3, . . . extend along the X direction; or column direction of the matrix pattern. The segment electrodes indicated by R1, R4, . . . , Rn ("n" being a predetermined integer) are allocated to display a first color pixel among three primary colors such as red, green and blue, e.g., the red pixel in the preferred embodiment. Similarly, the segment electrodes represented by G2, G5, . . . , Gn ("n" being a predetermined integer) are allocated to display a second color pixel, e.g., the green pixel in the preferred embodiment, whereas the segment electrodes defined by B3, B6, . . . , Bn ("n" being a predetermined integer) are allocated to display a third color pixel, e.g., the blue pixel in the preferred embodiment. These segment electrodes for displaying red, green and blue pixels R1, R4, G2, G5, B3, B6, . . . , Rn, Gn and Bn are so constructed that red, green and blue color filters are formed on surfaces of transparent electrodes, and shaped in square dot-shaped electrodes. That is, a width of each dot-shaped electrode R1, G2, and B3 in the X direction (column direction) is equal to approximately a half width of each common electrode C1, C2, . . . , Cn, and another width of each dot-shaped electrode in the Y direction (line direction) is selected to be approximately the vertical width of the dot-shaped electrode in the X direction. In other words, the shape of this dot-shaped segment electrode is a square having an aspect ratio of 1:1, approximately. These dot-shaped segment electrodes R1, G2, B3, . . . , Rn, Gn and Bn are aligned in both upper and lower lines with respect to the respective common electrodes C1, C2, . . . , Cn along the horizontal (x) direction. The dot-shaped segment electrodes located along the upper line of the corresponding common electrode are positionally shifted by a ½ pitch of a single segment electrode to the dot-shaped segment electrodes positioned along the lower line thereof. Namely, these dot-shaped square segment electrodes R1, G2, B3, . . . , Rn, Gn and Bn are arranged in a zig-zag line along the horizontal (line) direction.

The feature of the fourth preferred embodiment is that the arrangement order of the segment electrodes positioned in the upper line along the Y-direction is repeatedly selected to the segment electrode for displaying the green pixel "G2" - the segment electrodes for displaying the red pixel "R1" - the segment electrode for displaying the green pixel "G2" - the segment electrode for displaying the green pixel "G5" - the segment electrode for displaying the red pixel "R4" - the segment electrode for displaying the green pixel "G5". Similarly, the arrangement order of the segment electrodes positioned in the lower line along the Y-direction is repeatedly selected to the segment electrode for displaying the red pixel "R1" - the segment electrode for displaying the blue pixel "B3" the segment electrode for displaying the blue pixel "B3" - the segment electrode for displaying the red pixel "R4" - the segment electrode for displaying the blue pixel "B6" - the segment electrode for displaying the blue pixel "B6". The segment electrodes for displaying the same color pixels aligned in a direction intersecting the longitudinal direction of the common electrodes C1, C2, . . . , Cn, namely in the vertical (column) direction, are connected to each other by means of the signal lines "a" and "a" passing through the corresponding segment electrodes for displaying the different color pixels. For instance, one segment electrode "R1" is connected to the other segment electrode "R1" in the vertical direction, one segment electrode "G2" is connected to the other segment electrode "G2", and similarly one segment electrode "B3" is connected to the other segment electrode "B3" aligned along the vertical direction.

One pair of two segment electrode columns for displaying the same color pixels is connected to each other by means of signal line "b" at their end portions. These paired segment electrode columns such as the R1 column and R1 column; the G2 column and G2 column; and the B3 column and B3 column, are positioned directly adjacent to each other, or adjacent the segment electrode columns for displaying the different color pixel. These adjoining segment electrode columns, e.g., R1 and R1; G2 and G2; and B3 and B3 are commonly connected to the segment electrode terminals Y1, Y2, Y3, . . . , Yn by means of the connecting lines "b".

It should be noted that the above-described segment electrode terminals Y1, Y2, Y3, . . . , Y7 are alternately arranged in both the upper and lower sides of the matrix type color liquid crystal display device. Among the respective segment electrode columns, the specified segment electrode columns B3 and B3; B6 and B6 and so on are connected to the segment electrode terminals Y3, Y6, . . . , in such a manner that either one of these specified segment electrode columns is connected to these electrode terminals at the opposite ends of the connecting ends of the connecting lines "b". As a result, these segment electrode columns are commonly connected to the corresponding segment electrode terminals Y3, Y6, ..., and other segment electrode columns (the R1 and R1 columns, the G2 and G2 columns, the R4 and R4 columns, and the G5 and G5 columns) are commonly connected to the respective segment electrode terminals Y1, Y2, Y4, Y5 ..., via the connecting lines "b" to connect both the segment electrode columns.

With the above-described arrangements, the matrix type electrode pattern of the color liquid crystal display device according to the fourth preferred embodiment can be constructed with having the specific pattern of the square dot-shaped segment electrodes in combination with the common electrodes.

DRIVING OPERATION OF FOURTH MATRIX TYPE COLOR LCD

The matrix type color liquid crystal display device employing the square dot-shaped segment electrodes according to the fourth preferred embodiment will now be driven under the following conditions. The common electrodes C1, C2, ..., Cn arranged along the Y, or vertical direction are sequentially driven, and the segment drive signals are selectively applied to the corresponding segment electrode terminals Y1, Y2, Y3, ..., Yn in synchronism with the driving operation of the common electrodes, with the result that the full-color image can be displayed on the matrix type color liquid crystal display device shown in FIG. 6. This full-color image is displayed, according to the fourth preferred embodiment, by driving six-combined segment electrodes in such a manner that these combinations are selected from the segment electrodes R1, R1, G2, G2, B3, and B3 which are driven by supplying the drive signals to the segment electrodes terminals Y1, Y2 and Y3, and also from the segment electrodes R4, R4, G5, G5, B6, and B6, which are driven by supplying the drive signals to the segment electrode terminals Y4, Y5, Y6 and Y7. In other words, the full-color image can be displayed by way of the specified six-pixel combinations.

As previously described, in the matrix type color liquid crystal display device according to the fourth preferred embodiment, the segment electrodes for displaying the red pixels R1, R4, ..., the segment electrodes for displaying the green pixels G2, G5, ..., and the segment electrodes for displaying the blue pixels B3, B6, ..., are formed as the square dot-shaped electrodes which has an about half width of a vertical width of one common electrode. Also these segment electrodes for displaying the red, green, and blue pixels are alinged in both upper and lower lines of the corresponding common electrode under the condition that the segment electrodes positioned in the upper line are positionally shifted by ½ pitch of a single segment electrode with respect to those in the lower line. As a result, such stripe patterns that the same color pixels arranged in the direction (i.e., vertical direction) normal to the longitudinal direction (i.e., horizontal direction) are continued while displayed, are no longer perceptible to a viewer, which is similar to the conventional dot electrode type color liquid crystal display device. In addition, according to the fourth matrix type color liquid crystal display device, the adjoining segment electrode columns for displaying the same color pixels among the respective segment electrode columns connected by the signal lines "a" and "a" are combined to form one paired segment electrode column, and the one paired segment electrode columns are commonly connected to each other by the connecting lines "b". Then, the one-paired segment electrode columns are simultaneously driven in the fourth preferred embodiment, so that the following advantages thereof can be achieved. That is, the number of the segment electrode columns which can be driven by the same circuit-scaled segment driver circuit under the same sampling frequency, becomes approximately two times greater than that of the single-driven segment electrode column. As a consequence, in the matrix type color liquid crystal display device according to the fourth preferred embodiment, the number of the segment electrode columns can be increased without employing the large-scaled segment driver circuit under the higher sampling frequency, and furthermore the horizontal widths of the color pixels can be made small and thus the higher density of the color pixels can be achieved. Therefore, the color balance of the matrix type color liquid crystal display device can be considerably improved, as compared with the conventional dot electrode type color liquid crystal display device, and moreover, the image quality of the displayed image by the matrix type color liquid crystal display device can be increased with maintaining no perceptible appearance of the specific color pixel.

Since the matrix type color LCD according to the fourth preferred embodiment may be modified based upon the modifications described in the first preferred embodiment, no further detailed explanation is done for the sake of the simplicity.

CONSTRUCTION OF FIFTH AND SIXTH MATRIX TYPE ELECTRODE PATTERNS

Matrix type electrode patterns of a color liquid crystal display device according to fifth and sixth preferred embodiments of the invention will now be described with reference to FIGS. 7 and 8.

Figure 7:
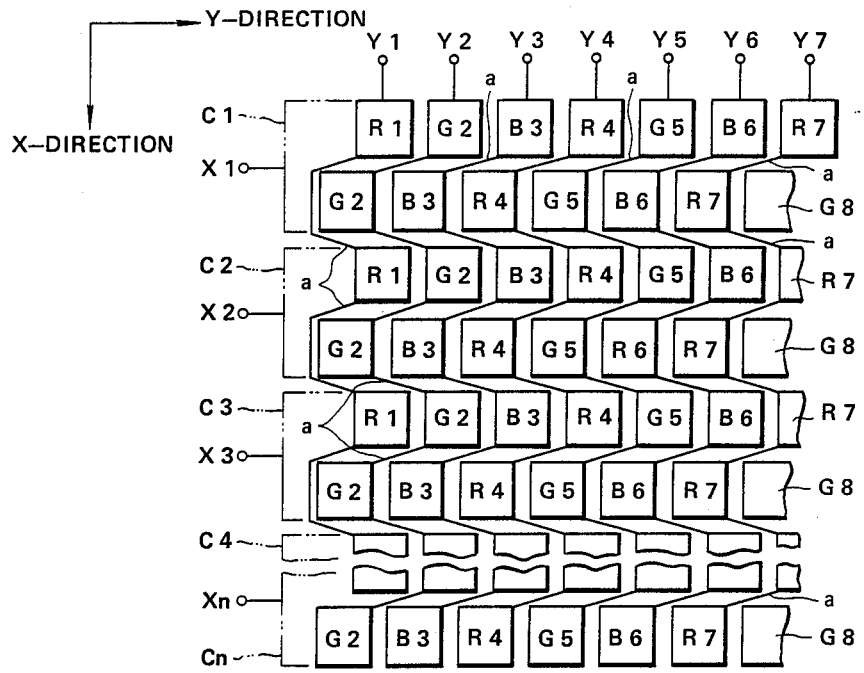
FIG. 7 schematically illustrates an electrode pattern of the matrix type color LCD according to a fifth preferred embodiment of the invention.

The fifth matrix type color liquid crystal display device, shown in FIG. 7, is constructed of: a large quantity of horizontal stripe-shaped common electrodes C1, C2, C3, ..., Cn ("n" being a predetermined integer) having common electrode terminals X1, X2, ..., Xn ("n" being also a predetermined integer); a number of segment electrodes R1, R4, G2, G5, B3, B6, ..., positioned opposite to the respective common electrodes C1, C2, ..., Cn and having segment electrode terminals Y1, Y2, Y7, .... The common electrodes C1, C2, ..., Cn similarly extend along the Y direction, or line direction, whereas the segment electrodes R1, G2, B3, ... extend along the X direction; or column direction of the matrix pattern. The segment electrodes indicated by R1, R4, ..., Rn ("n" being a predetermined integer) are allocated to display a first color pixel among three primary colors such as red, green and blue, e.g., the red pixel in the preferred embodiment. Similarly, the segment electrodes represented by G2, G5, ..., Gn ("n" being a predetermined integer) are allocated to display a second color pixel, e.g., the green pixel in the preferred embodiment, whereas the segment electrodes defined by B3, B6, ..., Bn ("n" being a predetermined integer) are allocated to display a third color pixel, e.g., the blue pixel in the preferred embodiment. These segment electrodes for displaying red, green and blue pixels R1, R4, G2, G5, B3, B6, ..., Rn, Gn and Bn are so constructed that red, green and blue color filters are formed on surfaces of transparent electrodes, and shaped in square dot-shaped electrodes. That is, a width of each dot-shaped electrode R1, G2, and B3 in the X direction (column direction) is equal to approximately a half width of each common electrode C1, C2, ..., Cn, and another width of each dot-shaped electrode in the Y direction (line direction) is selected to be approximately the vertical width of the dot-shaped electrode in the X direction. In other words, the shape of this dot-shaped segment electrode is a square having an aspect ratio of 1:1, approximately. These dot-shaped segment electrodes R1, G2, B3, ..., Rn, Gn and Bn are aligned in both upper and lower lines with respect to the respective common electrodes C1, C2, ..., Cn along the horizontal (x) direction. The dot-shaped segment electrodes located along the upper line of the corresponding common electrode are positionally shifted by a ½ pitch of a single dot-shaped segment electrode to the dot-shaped segment electrodes positioned along the lower line thereof.

The feature of the matrix type electrode pattern according to the fifth preferred embodiment is as follows. That is, the segment electrodes for displaying the same color pixel among the entire segment electrodes are aligned in a single column formed along the vertical (X) direction (i.e., in the direction perpendicular to the longitudinal direction of the respective common electrodes C1, C2, ..., Cn). In addition, one pair of two segment electrode columns for displaying the same color pixel such as the G2 and G2 columns; the B3 and B3 columns; the R4 and R4 columns and so on, is connected to each other in a one-paired segment electrode column. These one-paired segment electrode columns are positioned adjacent to each other while sandwiching the segment electrode columns for displaying the different color pixels. Both the respective segment electrodes of one segment electrode column of the above-described pair column and the respective segment electrodes of the other segment electrode column are alternately connected with each other by means of signal lines "a" and "a" which are obliquely wired through the respective segment electrodes between the above-described pairs of the segment electrode columns. Thus, these segment electrode columns are connected via the segment electrodes G2, B3, R4, ..., positioned in the upper-most line to the segment electrode terminals Y2, Y3, Y4, ..., arranged at the upper side of the matrix type electrode pattern, as illustrated in FIG. 7.

It should be noted that since there is only one segment electrode column (i.e., the first R1 column) among the segment electrode columns R1, R4, R7, ..., the respective segment electrodes R1, R1, ... belonging to this first R1 column are connected by means of a signal line "a" which is detoured at the outside of the segment electrodes for displaying the green pixel G2, G2, ... among these segment electrodes for displaying the red pixel R1, R1, ..., to the segment electrode terminal Y1 via the segment electrode R1 positioned at the upper-most line.

With the above-described arrangements, the matrix type electrode pattern of the color liquid crystal display device according to the fifth preferred embodiment can be constructed with having the specific pattern of the square dot-shaped segment electrodes in combination with the common electrodes. The particular advantage of the fifth preferred embodiment is that since the segment electrode terminals Y1, Y2, ..., Yn are arranged only at one side, i.e., the upper side of the matrix type color liquid crystal display device, the segment electrodes can be readily connected via these one-sided segment electrode terminals to the segment electrode driver circuit (not shown in detail).

Figure 8:
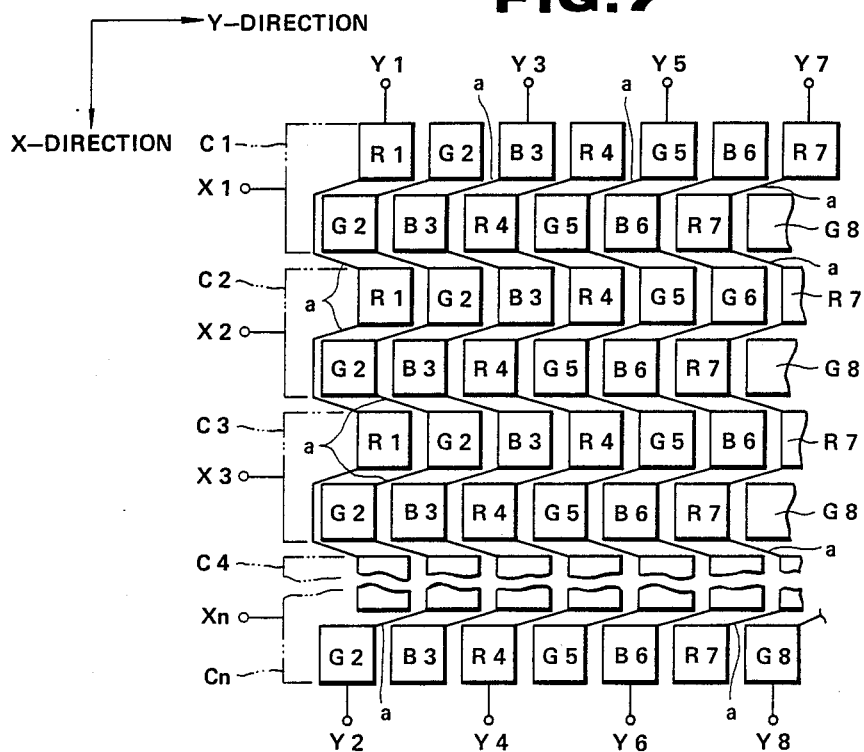
FIG. 8 schematically illustrates an electrode pattern of the matrix type color LCD according to a sixth preferred embodiment of the invention.

Moreover, as shown in FIG. 8, the particular advantage of the matrix type color liquid crystal display device according to the sixth preferred embodiment is to construct this matrix type electrode pattern in the higher density with maintaining the same other advantages of the fifth preferred embodiment.

DRIVING OPERATION OF FIFTH AND SIXTH MATRIX TYPE COLOR LCD'S

The matrix type color liquid crystal display devices employing the square dot-shaped segment electrodes according to the fifth and sixth preferred embodiments will now be driven under the following conditions. The common electrodes C1, C2, ..., Cn arranged along the X, or vertical direction are sequentially driven, and the segment drive signals are selectively applied to the corresponding segment electrode terminals Y1, Y2, Y3, Y4, ..., Yn in synchronism with the driving operation of the common electrodes, with the result that the full-color image can be displayed on the matrix type color liquid crystal display devices shown in FIGS. 7 and 8. This full-color image is displayed, according to the fifth and sixth preferred embodiments, by driving six-combined segment electrodes in such a manner that these combinations are selected from the segment electrodes R1, G2, G2, B3, B3, R4 (located in the lower line in FIGS. 7 and 8) which are driven by supplying the drive signals to the segment electrode terminals Y1, Y2, Y3, and Y4 and from the segment electrodes R4 (positioned in the upper line in FIGS. 7 ad 8), G5, G5, B6, B6, and R7 (positioned in the lower line in FIGS. 7 and 8) which are driven by supplying the drive signals to the segment electrode terminals Y4, Y5, Y6 and Y7. It should be noted that since the segment electrodes for displaying the red pixels R4, R7, ..., except for the segment electrode for displaying the red pixel "R1" are positioned on both six groups of the adjoining segment electrodes, when one group of the segment electrodes for displaying the red pixels R4, R7, ..., is driven, the adjoining group of the segment electrodes for displaying the red pixels R4, R7 is driven in conjunction with the first-mentioned segment electrode group R4, R7, .... Accordingly, although these red pixels of the segment electrodes are illuminated, the red pixels displayed in the adjoining electrode groups are very small and thus are not substantially perceptible to a viewer, because both the vertical and horizontal widths of the respective segment electrodes R1, G2, B3, R4, ..., of the matrix type color liquid crystal display device are designed to be equal to approximately a half width of the common electrode in the vertical (Y) direction.

As previously described, in the matrix type color liquid crystal display devices according to the fifth and sixth preferred embodiments, the segment electrodes for displaying the red pixels R1, R4, ..., the segment electrodes for displaying the green pixels G2, G5, ..., and the segment electrodes for displaying the blue pixels B3, B6, ..., are formed as the square dot-shaped electrodes which has about a half width of a vertical width of one common electrode. Also these segment electrodes for displaying the red, green, and blue pixels are aligned in both upper and lower lines of the corresponding common electrode under the condition that the segment electrodes positioned in the upper line are positionally shifted by a ½ pitch of a single dot-shaped segment electrode with respect to those in the lower line. As a result, such stripe patterns that the same color pixels arranged in the direction (i.e., vertical direction) normal to the longitudinal direction (i.e., horizontal direction) are continued while displayed, are no longer perceptible, which is similar to the conventional dot electrode type color liquid crystal display device.

In addition to the above-described particular advantage of the fifth and sixth preferred embodiments, the adjoining segment electrode columns for displaying the same color pixels, which are positioned in the column (vertical) direction intersecting the longitudinal direction of the common electrode while sandwiching the segment electrode column for displaying the different color pixel, are commonly connected to each other so as to form one pair of the segment electrode column to display the same color pixel. Then, the respective segment electrode of the one segment electrode column of the above-described pair column and the respective segment electrodes of the other segment electrode column are alternately connected to each other by way of the signal lines "a" and "a" which are obliquely wired through the respective segment electrodes between the above-described pairs of the segment electrode columns. Then, these two segment electrode columns are simultaneously driven in the fifth and sixth preferred embodiments, so that the following advantages thereof can be achieved. That is, since the number of the segment electrode columns which can be driven by the same circuit-scaled segment driver circuit under the same sampling frequency, becomes approximately two times greater than that of the single-driven segment electrode columns, the horizontal widths of the respective segment electrodes R1, G2, B3, ... Rn, Gn and Bn can be made approximately ½. As a consequence, in the matrix type color liquid crystal display devices according to the fifth and sixth preferred embodiments, the number of the segment electrode columns can be increased without employing the large-scaled segment driver circut under the higher sampling frequency, and furthermore the sizes of the color pixels can be made small and thus the higher density of the color pixels can be achieved. Therefore, the color balance of the matrix type color liquid crystal display devices can be considerably improved, as compared with the conventional dot electrode type color liquid crystal display device, and moreover, the image quality of the displayed image by the matrix type color liquid crystal display devices can be increased while maintaining no perceptible appearance of the specific color pixel.

MODIFIED FIFTH AND SIXTH MATRIX TYPE COLOR LCD'S

In the above-described fifth preferred embodiment, all of the segment electrode terminals Y1, Y2, Y3, Y4, ... Yn were arranged in the upper side of the matrix type color liquid crystal display device shown in FIG. 7. However, these segment electrode terminals may be alternately arranged in both upper and lower sides, as illustrated in FIG. 8. Moreover, in the above-described fifth and sixth preferred embodiments, the first color pixel was selected to be red, the second color pixel was selected to be green, and the third color pixel was selected to be blue. It is, of course, possible to select different color combinations other than the above-described RGB color combination, for instance, cyan, orange and magenta color combination. Since the horizontal widths of the respective segment electrodes R1, G2, B3, ... Rn, Gn and Bn are determined by the LCD screen size and the number of the color pixels in the horizontal direction, namely, the number of the segment electrode columns, the aspect ratio of the respective segment electrodes R1, G2, B3, ..., may not be always selected to be approximately 1:1 depending upon the number of the displayed pixels. Even in such a specific case, the shapes of the displayed pixels are slightly changed but both the good color balance of the respective color pixels and no perceptible appearance can be achieved. Although the respective color filters were formed on the surfaces of the corresponding segment electrodes R1, G2, B3, ..., Rn, Gn and Bn in the fifth and sixth preferred embodiments, these color filters may be formed under the corresponding segment electrodes. Otherwise, these color filters may be formed at either the common electrode side, or the outer surfaces of the pixels, and positioned opposite to the corresponding segment electrodes.

Also, the positional shift between the segment electrodes located in both the upper and lower lines may be properly determined from approximately 0 pitch to approximately 1 pitch of a single electrode width.

COLOR LCD TELEVISION EMPLOYING MATRIX TYPE COLOR LCD DEVICE

A color liquid crystal television employing a matrix type color LCD device according to a seventh preferred embodiment of the present invention will now be described with reference to FIGS. 9 and 10.

Figure 9:
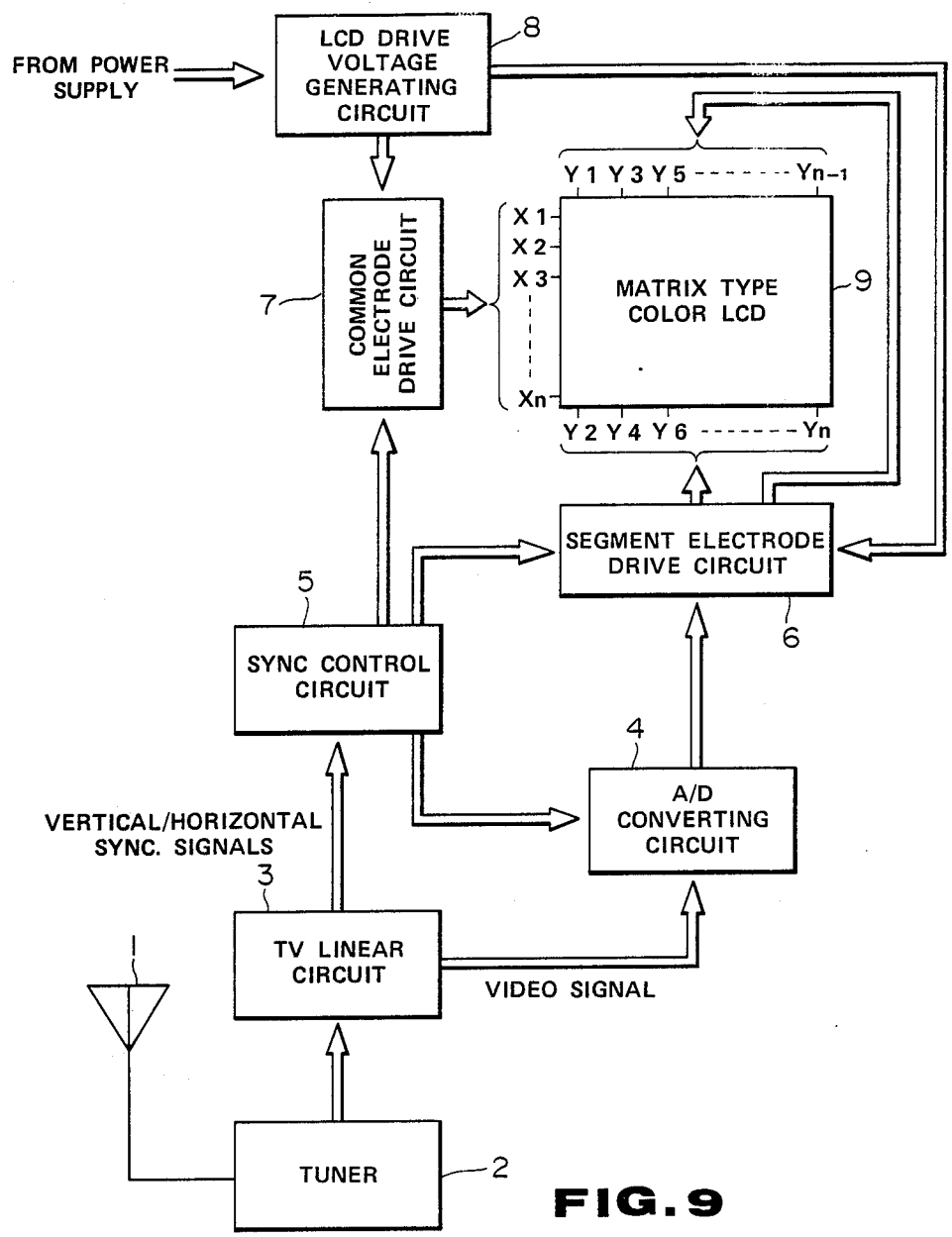
FIG. 9 is a schematic circuit arrangement of a color LCE television employing the matrix type color LCD according to a seventh preferred embodiment of the invention.

In FIG. 9, there is shown a schematic block diagram of the color liquid crystal television employing the matrix type LCD device according to the seventh preferred embodiment. An antenna 1 receives television broadcating signals. The television broadcasting signals is then input into a television tunner 2. The television tunner 2 selects the desired television signal from the received television signals and thereafter converts the desired television signal into an intermediate frequency signal, and outputs this intermediate frequency signal to a television linear circuit 3. In the television linear circuit 3, the intermediate frequency signal derived from the tunner 2 is amplified and thereafter video signal and also sync-separated to derive both a vertical sync signal and a horizontal sync signal. The resultant video signal is supplied to an A/D (analog-to-digital) converting circuit 4, and also both the vertical and horizontal sync signals are supplied to a sync control circuit 5, respectively. The sync control circuit 5 produces various timing signals from the vertical and horizontal sync signals, and thus supplies these timing signals to the A/D converting circuit 4, a segment electrode drive circuit 6, and a common electrode drive circuit 7. To both the segment electrode drive circuit 6 and common electrode drive circuit 7, liquid-crystal-device drive signals having a multi-level are applied from a circuit for generating an LCD drive voltage 8. In the A/D converting circuit 4, the video signal is A/D-converted into, for instance, 3-bit digital data in synchronism with a sampling clock supplied from the sync control circuit 5. The resultant 3-bit digital data is output to the segment electrode drive circuit 6. From this segment electrode drive circuit 6, a gradation signal is produced in accordance with the digital data derived from the A/D converting circuit 4. This gradation signal is used to drive the segment electrodes (not shown in detail) of the matrix type color liquid crystal display device 9 according to the invention. Similarly, from the above-described common electrode drive circuit 7, the drive signal for common electrodes (i.e., the scanning electrodes) is produced in accordance with the timing signal derived from the sync control circuit 5. Thus, the common electrodes (the scanning electrodes) of the color liquid crystal display device 9 are sequentially, selectively driven by the common electrode drive signal.

Figure 10:
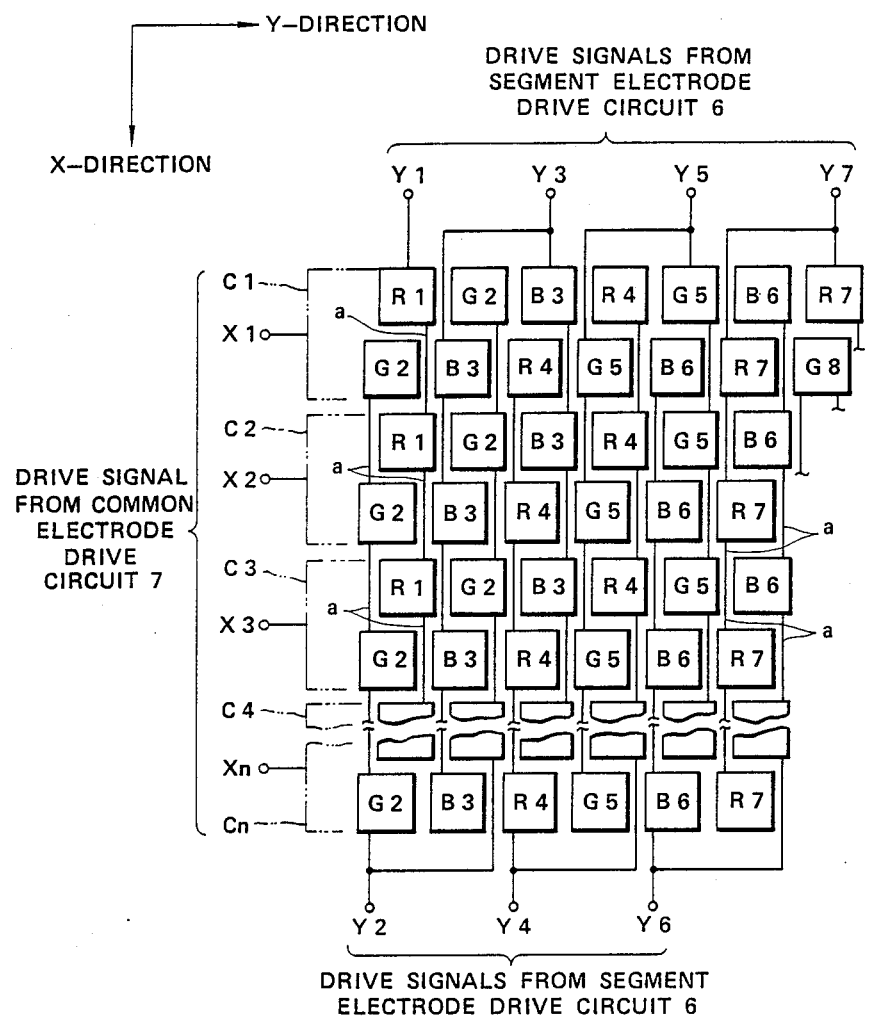
FIG. 10 schematically illustrates an electrode pattern of the matrix type color LCD shown in FIG. 9.

Referring now to FIG. 10, the constructions of both the common electrodes as well as the segment electrodes will be described more in detail.

The matrix type color liquid crystal display device, shown in FIG. 10, is constructed of: a large quantity of horizontal stripe-shaped common electrodes $C_1$, $C_2$, $C_3$, ..., $C_n$ ("n" being a predetermined integer) having common electrode terminals $X_1$, $X_2$, ..., $X_n$ ("n" being also a predetermined integer); a number of segment electrodes $R_1$, $R_4$, $G_2$, $G_5$, $B_3$, $B_6$, ..., positioned opposite to the respective common electrodes $C_1$, $C_2$, ..., $C_n$ and having segment electrode terminals $Y_1$, $Y_2$, $Y_7$, .... The common electrodes $C_1$, $C_2$, ..., $C_n$ extend along the Y direction, or line direction, whereas the segment electrodes $R_1$, $G_2$, $B_3$, ... extend along the X direction; or column direction of the matrix pattern. The segment electrodes indicated by $R_1$, $R_4$, ... $R_n$ ("n" being a predetermined integer) are allocated to display a first color pixel among three primary colors such as red, green and blue, e.g., the red pixel in the seventh preferred embodiment. Similarly, the segment electrodes represented by $G_2$, $G_5$, ... $G_n$ ("n" being a predetermined integer) are allocated to display a second color pixel, e.g., the green pixel in the preferred seventh embodiment, whereas the segment electrodes defined by $B_3$, $B_6$, ..., $B_n$ ("n" being a predetermined integer) are allocated to display a third color pixel, e.g., the blue pixel in the seventh preferred embodiment. These segment electrodes for displaying red, green and blue pixels $R_1$, $R_4$, $G_2$, $G_5$, $B_3$, $B_6$, ..., $R_n$, $G_n$ and $B_n$ are so constructed that red, green, and blue color filters are formed on surfaces of transparent electrodes, and shaped in square dot-shaped electrodes. That is, a width of each dot-shaped electrode $R_1$, $G_2$, and $B_3$ in the X direction (column direction) is equal to approximately a half width of each common electrode $C_1$, $C_2$, ..., $C_n$, and another width of each dot-shaped electrode in the Y direciton (line direction) is selected to be approximately the vertical width of the dot-shaped electrode in the X direction. In other words, the shape of this dot-shaped segment electrode is a square having an aspect ratio of 1:1, approximately.

The feature of the seventh preferred embodiment is that these dot-shaped segment electrodes $R_1$, $G_2$, $B_3$, ..., $R_n$, $G_n$ and $B_n$ are aligned in both upper and lower lines with respect to the respective common electrodes $C_1$, $C_2$, ..., $C_n$ along the horizontal (Y) direction. The dot-shaped segment electrodes located along the upper line of the corresponding common electrode are positionally shifted by a ¼ pitch of a single dot-shaped segment electrode to the dot-shaped segment electrodes positioned along the lower line thereof. Namely, these dot-shaped square segment electrodes $R_1$, $G_2$, $B_3$, ... $R_n$, $G_n$ and $B_n$ are arranged in a zig-zag line along the horizontal direction.

The segment electrodes for displaying the same color pixels aligned in a direction perpendicular to the longitudinal direction of the respective common electrodes $C_1$, $C_2$, ..., $C_n$, are connected to each other by means of the signal lines "a" and "a" passing through the corresponding segment electrodes for displaying the different color pixels. For instance, one segment electrode "R1" is connected to the other segment electrode "R1" aligned in the vertical direction, one segment electrode "G2" is connected to the other segment electrode "G2", and one segment electrode "B3" is connected to the other segment electrode "B3" arranged in the vertical direction. One pair of two adjoining segment electrode columns for displaying the same color pixel are commonly connected to each other in such a manner that one segment electrode column for displaying the same color pixel, e.g., "B3" while sandwiching the segment electrode column for displaying the different color pixel, i.e., "G2" among the respective segment electrode columns, is connected by the above connecting lines "a" and "a" in the preferred embodiment. That is, one segment electrode column "G2" is connected to the other segment electrode column "G2" to form a one-paired segment electrode column, and, one segment electrode column "R4" is connected to the other segment electrode column "R4" to form one-paired segment electrode column. These paired segment electrode columns are commonly connected at their end portions to the corresponding segment electrode terminals $Y_2$, $Y_3$, $Y_4$, ..., $Y_n$ ("n" being a predetermined integer).

It should be noted that the first segment electrode column, i.e., segment electrode column "R1" is solely connected to the first segment electrode terminal "Y1", and also the above-described segment electrode terminals $Y_1$, $Y_2$, $Y_3$, ..., $Y_7$ are alternately arranged in both the upper and lower sides of the matrix type color liquid crystal display device so as not to intersect the common connecting lines "a" with each other.

With the above-described arrangements, the matrix type electrode pattern of the color liquid crystal display device according to the seventh preferred embodiment can be constructed with having the specific pattern of the square dot-shaped segment electrodes in combination with the common electrodes.

The matrix type color liquid crystal display device employing the square dot-shaped segment electrodes according to the seventh preferred embodiment will now be driven under the following conditions. The common electrodes $C_1$, $C_2$, ..., $C_n$ arranged along the Y, or vertical direction are sequentially driven by the common electrode drive circuit 7, and the segment drive signals derived from the segment electrode drive circuit 6 are selectively applied to the corresponding segment electrode terminals $Y_1$, $Y_2$, $Y_3$, ..., $Y_n$ in synchronism with the driving operation of the common electrodes, with the result that the full-color image can be displayed on the matrix type color liquid crystal display device shown in FIG. 10. This full-color image is displayed, according to the seventh preferred embodiment, by driving six-combined segment electrodes in such a manner that these combinations are selected from the segment electrodes $R_1$, $G_2$; $G_2$, $B_3$, $B_3$, $R_4$ (located in the lower line in FIG. 10) which are driven by supplying the drive signals to the segment electrode terminals $Y_1$, $Y_2$, $Y_3$, and $Y_4$, and from the segment electrodes $R_4$ (positioned in the upper line in FIG. 10), $G_5$, $G_5$, $B_6$, $B_6$, and $R_7$ (positioned in the lower line in FIG. 10) which are driven by supplying the drive signals to the segment electrode terminals $Y_4$, $Y_5$, $Y_6$ and $Y_7$. It should be noted that since the segment electrodes for displaying the red pixels $R_4$, $R_7$, ..., except for the segment electrode for displaying the red pixel "R1" are positioned on both six groups of the adjoining segment electrodes, when one group of the segment electrodes for displaying the red pixels $R_4$, $R_7$, ..., is driven, the adjoining group of the segment electrodes for displaying the red pixels R4, R7 is driven in conjunction with the first-mentioned segment electrode group. Accordingly, although these red pixels of the segment electrodes are illuminated, the red pixels displayed in the adjoining electrode groups are very small and thus are not substantially perceptible to a viewer, because both the vertical and horizontal widths of the respective segment electrodes R1, G2, B3, R4, . . . , of the matrix type color liquid crystal display device are designed to be equal to approximately a half width of the common electrode in the vertical (Y) direction.

As previously described, in the matrix type color liquid crystal display device according to the seventh preferred embodiment, segment electrodes for displaying the red pixels R1, R4, . . . , the segment electrodes for displaying the green pixels G2, G5, . . . , and the segment electrodes for displaying the blue pixels B3, B6, . . . , are formed as the square dot-shaped electrodes which has about a half width of a vertical width of one common electrode. Also these segment electrodes for displaying the red, green, and blue pixels are aligned in both upper and lower lines of the corresponding common electrode under the condition that the segment electrodes positioned in the upper line are positionally shifted by a ¼ pitch of a single dot-shaped segment electrode with respect to those in the lower line. As a result, such stripe patterns that the same color pixels arranged in the direction (i.e., vertical direction) normal to the longitudinal direction (i.e., horizontal direction) are continued while displayed, are no longer perceptible to a viewer, which is similar to the conventional dot electrode type color liquid crystal display device.

In addition to the above-described particular advantage of the seventh preferred embodiment, both the adjoining segment electrode columns for displaying the same color pixels, which are positioned in the column (vertical) direction with sandwiching the segment electrode column for displaying the different color pixel, are commonly connected to each other by way of the signal lines "a" and "a" so as to form one pair of the segment electrode column to display the same color pixel. Then, these two segment electrode columns are simultaneously driven in the seventh preferred embodiment, so that the following advantages thereof can be achieved. That is, since the number of the segment electrode column which can be driven by the same circuit-scaled segment driver circuit under the same sampling frequency, becomes approximately two times greater than that of the single-driven segment electrode column, the horizontal widths of the respective segment electrodes R1, G2, B3, . . . Rn, Gn and Bn can be made approximately ½. As a consequence, in the matrix type color liquid crystal display device according to the seventh preferred embodiment, the number of the segment electrode columns can be increased without employing the large-scaled segment driver circuit under the higher sampling frequency, and furthermore the sizes of the color pixels can be made small and thus the higher density of the color pixels can be achieved. Therefore, the color balance of the matrix type color liquid crystal display device can be considerably improved, as compared with the conventional dot electrode type color liquid crystal display device, and moreover, the image quality of the displayed image by the matrix type color liquid crystal display device can be increased with maintaining no perceptible appearance of the specific color pixel.

MODIFIED SEVENTH MATRIX TYPE COLOR LCD

In the above-described seventh preferred embodiment, the first color pixel was selected to be red, the second color pixel was selected to be green, and the third color pixel was selecte to be blue. Also it is, of course, possible to select different color combinations other than the above-described RGB color combination, for instance, cyan, orange and magenta color combiantion. Since the horizontal widths of the respective segment electrodes R1, G2, B3, . . . Rn, Gn and Bn are determined by the LCD screen size and the number of the color pixels in the horizontal direction, namely, the number of the segment electrode columns, the aspect ratio of the respective segment electrodes R1, G2, B3, . . . , may not be always selected to be approximately 1:1 depending upon the number of the displayed pixels. Even in such a specific case, the shapes of the displayed pixels are slightly changed but both the good color balance of the respective color pixels and no perceptible appearance can be achieved. Although the respective color filters were formed on the surfaces of the corresponding segment electrodes R1, G2, B3, . . . , Rn Gn and Bn in the fifth and sixth preferred embodiments, these color filters may be formed under the corresponding segment electrodes. Otherwise, these color filters may be formed at either the common electrode side, or the outer surfaces of the pixels, and positioned opposite to the corresponding segment electrodes.

Also, the positional shift between the segment electrodes located in both the upper and lower lines may be properly determined from approximately 0 pitch to approximately 1 pitch of a single electrode width.

What is claimed is:

1. A matrix type color liquid crystal display device, comprising:

a plurality of stripe-shaped common electrodes having a long edge extending along a horizontal direction, and also a short edge extending along a vertical direction perpendicular to the horizontal direction;

a plurality of substantially square-shaped segment electrodes for displaying at least three different color pixels, positioned opposite to said plurality of stripe-shaped common electrodes so as to form a matrix pattern, a width of each of said segments electrodes along the vertical direction being equal to approximately only one half that of said short edge of each of said common electrodes, and said segment electrodes being aligned along first and second lines, which are positioned parallel to each other along the horizontal direction, with respect to each of said common electrodes under the condition that said segment electrodes arranged in said first line are positionally shifted by a predetermined positional shift amount with respect to said segment electrodes arranged in said second line, and also said segment electrodes for displaying same color pixels are alinged along the vertical direction;

signal lines connected to said segment electrodes for selectively displaying the same color pixels along the vertical direction through said segment electrodes, for displaying the different color pixels and supplying drive signals thereto, thereby forming segment electrode columns for the same color pixels and different color pixels; and connection lines for connecting said segment electrode columns that display the same color pixels and which columns are positioned adjacent to each other in the vertical direction, so as to form individual pairs of adjoining same color segment electrode columns that sandwich segment electrode columns which display pixels of a different color among said segment electrode columns connected by said signal lines, said individual pairs of adjoining same color segment electrode columns arranged to be simultaneously energized via said connection lines and said signal lines.

2. A matrix type color liquid crystal display device as claimed in claim 1, wherein each of said individual pairs of segment electrode columns for displaying the same color pixels and connected by said connection lines sandwiches each of two segment electrode columns for displaying the different color pixels.

3. A matrix type color liquid crystal display device as claimed in claim 1, wherein each of said individual pairs of segment electrode columns for displaying the same color pixels and connected by said connection lines, sandwiches each of one segment electrode column for displaying a different color pixel, and said segment electrodes for displaying said three different color pixels are arranged along the horizontal direction in a predetermined order so that two segment electrodes for displaying the same color pixels are repeated.

4. A matrix type color liquid crystal display device as claimed in claim 1, wherein each of said segment electrode columns for displaying the same color pixels and connected by said connection and said signal lines is arranged in a repeated form by combining individual pairs of segment electrode columns sandwiching two segment electrode columns for displaying two different color pixels, and each of two-paired segment electrode columns sandwiching one segment electrode column for displaying the other different color pixel.

5. A matrix type color liquid crystal display device as claimed in claim 1, wherein each of said segment electrode columns, ends of which are connected by said connection lines is constructed by combining therebetween a pair of said segment electrode columns for sandwiching one segment electrode column having other color picture elements, another pair of said segment electrode columns for sandwiching two segment electrode columns having different color picture elements from each other, with another pair of said electrode columns for sandwiching three segment electrode columns having different color picture elements from the neighboring segment electrode columns.

6. A matrix type color liquid crystal display device as claimed in claim 1, wherein each of said segment electrode columns for displaying the same color pixels connected by said connection and said signal lines is arranged in a repeated form by combining: one-paired segment electrode columns for sandwiching one segment electrode column for displaying different color pixel among three segment electrode columns, two columns of which display the same color pixels and are not juxtaposed with each other; one-paired segment electrode columns for sandwiching two segment electrode columns for displaying two different color pixels from each other; and one-paired segment electrode columns for sandwiching one segment electrode column for displaying the different color pixel.

7. A matrix type color liquid crystal display device, comprising:

a plurality of stripe-shaped common electrodes having a long edge extending along a horizontal direction, and also a short edge extending along a vertical direction perpendicular to the horizontal direction;

a plurality of substantially square-shaped segment electrodes for displaying at least three different color pixels, positioned opposite to said plurality of stripe-shaped common electrodes so as to form a matrix pattern, a width of each of said segment electrodes along the vertical direction being equal to approximately only one half that of said short edge of each of said common electrodes, and said segment electrodes being aligned along first and second lines, which are positioned parallel to each other along the horizontal direction, with respect to each of said common electrodes under the condition that said segment electrodes arranged in said first line are positionally shifted by a predetermined positional shift amount with respect to said segment electrodes arranged in said second line, and also said segment electrodes for displaying same color pixels are aligned along the vertical direction;

signal lines connected to segment electrodes of one segment electrode column including same color pixels and belonging to said first line, and to another segment electrode column that displays the same color pixels and belonging to said second line among the segment electrode columns for displaying the same color pixels which are aligned along the vertical direction perpendicular to the longitudinal direction of said common electrodes, in such a manner that each of the segment electrodes of said segment electrode column having pixels belonging to said first line is alternately connected to each of the segment electrodes of said segment electrode column having pixels belonging to said second line.

8. A matrix type color liquid crystal display device as claimed in claim 7, wherein end portions of said segment electrodes are conducted in two opposite directions.

9. A color liquid crystal display type television apparatus, comprising:

a television signal receiving unit for receiving a desired television signal;

a television signal processing unit for processing said desired television signal to produce a video signal, a common-electrode drive signal, a segment-electrode drive signal, and a sync signal;

a matrix type color liquid crystal display device for displaying a color television image in response to said video signal, including:

a plurality of stripe-shaped common electrodes having a long edge extending along a horizontal direction, and also a short edge extending along a vertical direction perpendicular to the horizontal direction;

a plurality of substantially square-shaped segment electrodes for displaying at least three different color pixels, positioned opposite to said plurality of stripe-shaped common electrodes so as to form a matrix pattern, a width of each of said segment electrodes along the vertical direction being equal to approximately only one half that of said short edge of each of said common electrodes, and said segment electrodes being aligned along first and second lines, which are positioned parallel to each other along the horizontal direction, with respect to each of said common electrodes under the condition that said segment electrodes arranged in said first line are positionally shifted by a predetermined positional shift amount with respect to said segment electrodes arranged in said second line, and also said segment electrodes for displaying same color pixels are alinged along the vertical direction;

signal lines connected to said segment electrodes for selectively displaying the same color pixels along the vertical direction through said segment electrodes, for displaying the different color pixels and supplying drive signals thereto, thereby forming segment electrode columns for the same color pixels and different color pixels;

connection lines for connecting said segment electrode columns that display the same color pixels and which columns are positioned adjacent to each other in the vertical direction, so as to form individual pairs of adjoining same color segment electrode columns that sandwich segment electrode columns which display pixels of a different color among said segment electrode columns connected by said signal lines, said individual pairs of adjoining same color segment electrode columns arranged to be simultaneously energized via said connection lines and said signal lines;

a common-electrode drive circuit for driving said plurality of common electrodes in response to said common-electrode drive signal and said sync signal derived from said television signal processing circuit; and a segment-electrode drive circuit for driving said plurality of segment electrodes in response to said segment-electrode drive signal and said sync signal derived from said television signal processing circuit.

10. A color liquid crystal display type television apparatus as claimed in claim 9, wherein each of said individual pairs of segment electrode columns for displaying the same color pixels and connected by said connection lines sandwiches each of two segment electrode columns for displaying the different color pixels.

11. A color liquid crystal display type television apparatus as claimed in claim 9, wherein each of said individual pairs of segment electrode columns for displaying the same color pixels and connected by said connection lines sandwiches each of one segment electrode column for displaying different color pixel, and said segment electrodes for displaying said three different color pixels are arranged along the horizontal direction in a predetermined order so that two segment electrodes for displaying the same color pixels are repeated.

12. A color liquid crystal display type television apparatus as claimed in claim 9, wherein each of said segment electrode columns for displaying the same color pixels and connected by said connection and said signal lines is arranged in a repeated form by combining individual pairs of segment electrode columns sandwiching two segment electrode columns for displaying two different color pixels, and two-paired segment electrode columns sandwiching one segment electrode column for displaying the other different color pixel.

13. A color liquid crystal display type television apparatus as claimed in claim 9, wherein each of said segment electrode columns, ends of which are connected by said connection lines constructed by combining therebetween a pair of said segment electrode columns for sandwiching one segment electrode column having other color picture elements, another pair of said segment electrode columns for sandwiching two segment electrode columns having different color picture elements from each other, with another pair of said electrode columns for sandwiching three segment electrode columns having different color picture elements from the neighboring segment electrode columns.

14. A color liquid crystal display type television apparatus as claimed in claim 9, wherein each of said segment electrode columns for displaying the same color pixels connected by said connection and said signal lines is arranged in a repeated form by combining: one-paired segment electrode columns for sandwiching one segment electrode column for displaying a different color pixel among three segment electrode columns, two columns of which display the same color pixels and are not juxtaposed with each other; one-paired segment electrode columns for sandwiching two segment electrode columns for displaying two different color pixels from each other; and one-paired segment electrode columns for sandwiching one segment electrode column for displaying the different color pixel.

15. A matrix type color liquid crystal display device, comprising:

a plurality of stripe-shaped common electrodes each having a long edge extending along a horizontal direction, and also a short edge extending along a vertical direction perpendicular to the horizontal direction;

a plurality of substantially square-shaped segment electrodes for displaying at least three different color pixels, positioned opposite to said plurality of stripe-shaped common electrodes so as to form a matrix pattern, a width of each of said segment electrodes along the vertical direction being equal to approximately one half that of said short edge of each of said common electrodes, and said segment electrodes being aligned along first and second lines that are positioned parallel to each other along the horizontal direction with respect to each of said common electrodes, wherein said segment electrodes arranged in said first line are positionally shifted by a predetermined positional shift amount with respect to the segment electrodes arranged in said second line, and wherein segment electrodes for displaying the same color pixels are aligned along the vertical direction;

signal lines connected to said segment electrodes for selectively displaying the same color pixels along the vertical direction through said segment electrodes, and for displaying different color pixels and supplying drive signals thereto, thereby forming segment electrode columns for the same color pixels and the different color pixels; and connection lines for connecting the segment electrode columns that display the same color pixels, which columns are positioned adjacent to each other in the vertical direction, and forming individual pairs of adjoining segment electrode columns that sandwich segment electrode columns which display different color pixels among the segment electrode columns connected by said signal lines, said pair of segment electrode columns being arranged to be simultaneously energized via said connection lines and said signal lines;

wherein said individual pairs of segment electrode columns that display the same color pixels are connected at their end portions by said connection lines, and sandwich each of two segment electrode columns which display color pixels different from each other.

16. A matrix type color liquid crystal display device, comprising:
   a plurality of stripe-shaped common electrodes each having a long edge extending along a horizontal direction, and also a short edge extending along a vertical direction perpendicular to the horizontal direction;
   a plurality of substantially square-shaped segment electrodes for displaying at least three different color pixels, positioned opposite to said plurality of stripe-shaped common electrodes so as to form a matrix pattern, a width of each of said segment electrodes along the vertical direction being equal to approximately one half that of said short edge of each of said common electrodes, and said segment electrodes being aligned along first and second lines that are positioned parallel to each other along the horizontal direction with respect to each of said common electrodes, wherein said segment electrodes arranged in said first line are positionally shifted by a predetermined positional shift amount with respect to the segment electrodes arranged in said second line, and wherein segment electrodes for displaying the same color pixels are aligned along the vertical direction;
   signal lines connected to said segment electrodes for selectively displaying the same color pixels along the vertical direction through said segment electrodes, and for displaying different color pixels and supplying drive signals thereto, thereby forming segment electrode columns for the same color pixels and the different color pixels; and
   connection lines for connecting the segment electrode columns that display the same color pixels, which columns are positioned adjacent to each other in the vertical direction, and forming individual pairs of adjoining segment electrode columns that sandwich segment electrode columns which display different color pixels among the segment electrode columns connected by said signal lines, said pair of segment electrode columns being arranged to be simultaneously energized via said connection lines sand said signal lines;
   wherein said individual pairs of segment electrode columns that display the same color pixels are connected at their end portions by said connection lines, and each connected pair sandwiches one segment electrode column which displays pixels of a different color, and wherein segment electrodes displaying three different color pixels are arranged along the horizontal direction in a certain order so that two segment electrodes which display the same color pixels are successively repeated.

17. A matrix type color liquid crystal display device, comprising:
   a plurality of stripe-shaped common electrodes each having a long edge extending along a horizontal direction, and also a short edge extending along a vertical direction perpendicular to the horizontal direction;
   a plurality of substantially square-shaped segment electrodes for displaying at least three different color pixels, positioned opposite to said plurality of stripe-shaped common electrodes so as to form a matrix pattern, a width of each of said segment electrodes along the vertical direction being equal to approximately one half that of said short edge of each of said common electrodes, and said segment electrodes being aligned along first and second lines that are positioned parallel to each other along the horizontal direction with respect to each of said common electrodes, wherein said segment electrodes arranged in said first line are positionally shifted by a predetermined positional shift amount with respect to the segment electrodes arranged in said second line, and wherein segment electrodes for displaying the same color pixels are aligned along the vertical direction;
   signal lines connected to said segment electrodes for selectively displaying the same color pixels along the vertical direction through said segment electrodes, and for displaying different color pixels and supplying drive signals thereto, thereby forming segment electrode columns for the same color pixels and the different color pixels; and
   connection lines for connecting the segment electrode columns that display the same color pixels, which columns are positioned adjacent to each other in the vertical direction, and forming individual pairs of adjoining segment electrode columns that sandwich segment electrode columns which display different color pixels among the segment electrode columns connected by said signal lines, said pairs of segment electrode columns being arranged to be simultaneously energized via said connection lines and said signal lines;
   wherein said individual pairs of segment electrode columns that display the same color pixels are connected at their end portions by said connection lines, and are arranged in a repeated form by combining one connected pair of segment electrode columns that sandwich two segment electrode columns displaying two different color pixels, and each of two connected pairs of segment electrode columns that sandwich one segment electrode column displaying pixels of a third different color.

18. A matrix type color liquid crystal display device, comprising:
   a plurality of stripe-shaped common electrodes having a long edge extending along a horizontal direction, and also a short edge extending along a vertical direction perpendicular to the horizontal direction;
   a plurality of substantially square-shaped segment electrodes for displaying at least three different color pixels, positioned opposite to said plurality of stripe-shaped common electrodes so as to form a matrix pattern, a width of each of said segment electrodes along the vertical direction being equal to approximately one half that of said short edge of each of said common electrodes, and said segment electrodes being aligned along first and second lines, which are positioned parallel to each other along the horizontal direction, with respect to each of said common electrodes under the condition that said segment electrodes arranged in said first line are positionally shifted by a predetermined positional shift amount with respect to said segment electrodes arranged in said second line, and also said segment electrodes for displaying same color pixels are aligned along the vertical direction;

signal lines connected to said segment electrodes for selectively displaying the same color pixels along the vertical direction through said segment electrodes, and for displaying different color pixels and supplying drive signals thereto, thereby forming segment electrode columns for the same color pixels and the different color pixels; and connection lines for connecting the segment electrode columns that display the same color pixels, which columns are positioned adjacent to each other in the vertical direction, and forming individual pairs of adjoining segment electrode columns that sandwich segment electrode columns which display different color pixels among the segment electrode columns connected by said signal lines, said pair of segment electrode columns being arranged to be simultaneously energized via said connection lines and said signal lines;

wherein said individual pairs of segment electrode columns that display the same color pixels are connected at their end portions by said connection lines, and are constructed by combining one connected pair of the electrode columns that sandwiches one segment electrode column having other color pixels, another connected pair of the electrode columns that sandwiches two segment electrode columns having pixels of colors different from each other, and another connected pair of the electrode columns that sandwiches three segment electrode columns having pixels of colors different from those of neighboring segment electrode columns.

19. A matrix type color liquid crystal display device, comprising:

a plurality of stripe-shaped common electrodes each having a long edge extending along a horizontal direction, and also a short edge extending along a vertical direction perpendicular to the horizontal direction;

a plurality of substantially square-shaped segment electrodes for displaying at least three different color pixels, positioned opposite to said plurality of stripe-shaped common electrodes so as to form a matrix pattern, a width of each of said segment electrodes along the vertical direction being equal to approximately one half that of said short edge of each of said common electrodes, and said segment electrodes being aligned along first and second lines that are positioned parallel to each other along the horizontal direction with respect to each of said common electrodes, wherein said segment electrodes arranged in said first line are positionally shifted by a predetermined positional shift amount with respect to the segment electrodes arranged in said second line, and wherein segment electrodes for displaying the same color pixels are aligned along the vertical direction;

signal lines connected to said segment electrodes for selectively displaying the same color pixels along the vertical direction through said segment electrodes, and for displaying different color pixels and supplying drive signals thereto, thereby forming segment electrode columns for the same color pixels and the different color pixels; and connection lines for connecting the segment electrode columns that display the same color pixels, which columns are positioned adjacent to each other in the vertical direction, and forming individual pairs of adjoining segment electrode columns that sandwich segment electrode columns which display different color pixels among the segment electrode columns connected by said signal lines, said pairs of segment electrode columns being arranged to be simultaneously energized via said connection lines and said signal lines;

wherein said individual pairs of segment electrode columns that display the same color pixels are connected at their end portions by said connection lines, and are arranged in a repeated form by combining one connected pair of the electrode columns that sandwiches segment electrode columns displaying different color pixels among three segment electrode columns, two columns of which display the same color pixels and are not juxtaposed to one another; one connected pair of the electrode columns that sandwiches two segment electrode columns displaying pixels of two different colors; and one connected pair of the electrode columns that sandwiches one segment electrode column which displays pixels of another different color.

20. A matrix type color liquid crystal displaying device, comprising:

a plurality of stripe-shaped common electrodes having a long edge extending along a horizontal direction, and also a short edge extending along a vertical direction perpendicular to the horizontal direction;

a plurality of substantially square-shaped segment electrodes for displaying at least three different color pixels, positioned opposite to said plurality of stripe-shaped common electrodes so as to form a matrix pattern, a width of each of said segment electrodes along the vertical direction being equal to approximately one half that of said short edge of each of said common electrodes, and said segment electrodes being aligned along first and second lines, which are positioned parallel to each other along the horizontal direction, with respect to each of said common electrodes under the condition that said segment electrodes arranged in said first line are positionally shifted by a predetermined positional shift amount with respect to said segment electrodes arranged in said second line, and also said segment electrodes for displaying same color pixels are aligned along the vertical direction and end portions of said segment electrodes are conducted in two opposite directions; and signal lines connected to one of a pair of segment electrode columns belonging to said first line, and to the other of said pair of segment electrode columns belonging to said second line among the segment electrode columns that display the same color pixels which are aligned along the vertical direction perpendicular to the longitudinal direction of said common electrodes, so that each of the segment electrodes of the electrode column belonging to said first line is alternately connected to each of the segment electrodes of the electrode column belonging to said second line.

21. A color liquid crystal display type television apparatus, comprising:

a television signal receiving unit for receiving a desired television signal;

a television signal processing unit for processing said desired television signal to produce a video signal, a common-electrode drive signal, a segment-electrode drive signal, and a sync signal;

a matrix type color liquid crystal display device for displaying a color television image in response to said video signal, including:

a plurality of stripe-shaped common electrodes having a long edge extending along a horizontal direction, and also a short edge extending along a vertical direction perpendicular to the horizontal direction;

a plurality of substantially square-shaped segment electrodes for displaying at least three different color pixels, positioned opposite to said plurality of stripe-shaped common electrodes so a to form a matrix pattern, a width of each of said segment electrodes along the vertical direction being equal to approximately one half that of said short edge of each of said common electrodes, and said segment electrodes being aligned along first and second lines that are positioned parallel to each other along the horizontal direction with respect to each of said common electrodes, wherein said segment electrodes arranged in said first line are positionally shifted by a predetermined positional shift amount with respect to the segment electrodes arranged in said second line, and wherein segment electrodes for displaying the same color pixels are aligned along the vertical direction;

signal lines connected to said segment electrodes for selectively displaying the same color pixels along the vertical direction through said segment electrodes, and for displaying different color pixels and supplying drive signals thereto, thereby forming segment electrode columns for the same color pixels and the different color pixels;

connection lines for connecting the segment electrode columns that display the same color pixels, which columns are positioned adjacent to each other in the vertical direction, and forming individual pairs of adjoining segment electrode columns that sandwich segment electrode columns which display different color pixels among the segment electrode columns connected by said signal lines, said pairs of segment electrode columns being arranged to be simultaneously energized via said connection lines and said signal lines;

a common-electrode drive circuit for driving said plurality of common electrodes in response to said common-electrode drive signal and said sync signal derived from said television signal processing circuit; and a segment-electrode drive circuit for driving said plurality of segment electrodes in response to said segment-electrode drive signal and said sync signal derived from said television signal processing circuit;

wherein each of said individual pairs of segment electrode columns that display the same color pixels are connected at their end portions by said connection lines, and sandwich each of two segment electrode columns which display pixels of colors that are different from each other.

22. A color liquid crystal display type television apparatus, comprising:

a television signal receiving unit for receiving a desired television signal;

a television signal processing unit for processing said desired television signal to produce a video signal, a common-electrode drive signal, a segment-electrode drive signal, and a sync signal;

a matrix type color liquid crystal display device for displaying a color television image in response to said video signal, including:

a plurality of stripe-shaped common electrodes having a long edge extending along a horizontal direction, and also a short edge extending along a vertical direction perpendicular to the horizontal direction;

a plurality of substantially square-shaped segment electrodes for displaying at least three different color pixels, positioned opposite to said plurality of stripe-shaped common electrodes so as to form a matrix pattern, a width of each of said segment electrodes along the vertical direction being equal to approximately one half that of said short edge of each of said common electrodes, and said segment electrodes being aligned along first and second lines that are positioned parallel to each other along the horizontal direction with respect to each of said common electrodes, wherein said segment electrodes arranged in said first line are positionally shifted by a predetermined positional shift amount with respect to the segment electrodes arranged in said second line, and wherein segment electrodes for displaying the same color pixels are aligned along the vertical direction;

signal lines connected to said segment electrodes for selectively displaying the same color pixels along the vertical direction through said segment electrodes, and for displaying different color pixels and supplying drive signals thereto, thereby forming segment electrode columns for the same color pixels and the different color pixels;

connection lines for connecting the segment electrode columns that display the same color pixels, which columns are positioned adjacent to each other in the vertical direction, and forming individual pairs of adjoining segment electrode columns that sandwich segment electrode columns which display different color pixels among the segment electrode columns connected by said signal lines, said pairs of segment electrode columns being arranged to be simultaneously energized via said connection lines and said signal lines;

a common-electrode drive circuit for driving said plurality of common electrodes in response to said common-electrode drive signal and said sync signal derived from said television signal processing circuit; and a segment-electrode drive circuit for driving said plurality of segment electrodes in response to said segment-electrode drive signal and said sync signal derived from said television signal processing circuit;

wherein each of said individual pairs of segment electrode columns that display the same color pixels are connected at their end portions by said connection lines, and sandwich each of one segment electrode column which displays pixels of a different color, and segment electrodes displaying the three different color pixels are arranged along the horizontal direction in a certain order so that two segment electrodes displaying the same color pixels are successively repeated.

23. A color liquid crystal display type television apparatus, comprising:

a television signal receiving unit for receiving a desired television signal;

a television signal processing unit for processing said desired television signal to produce a video signal, a common-electrode drive signal, a segment-electrode drive signal, and a signal;

a matrix type color liquid crystal display device for displaying a color television image in response to said video signal, including:

a plurality of stripe-shaped common electrodes having a long edge extending along a horizontal direction, and also a short edge extending along a vertical direction perpendicular to the horizontal direction;

a plurality of substantially square-shaped segment electrodes for displaying at least three different color pixels, positioned opposite to said plurality of stripe-shaped common electrodes so as to form a matrix pattern, a width of each of said segment electrodes along the vertical direction being equal to approximately one half that of said short edge of each of said common electrodes, and said segment electrodes being aligned along first and second lines that are positioned parallel to each other along the horizontal direction with respect to each of said common electrodes, wherein said segment electrodes arranged in said first line are positionally shifted by a predetermined positional shift amount with respect to the segment electrodes arranged in said second line, and wherein segment electrodes for displaying the same color pixels are aligned along the vertical direction;

signal lines connected to said segment electrodes for selectively displaying the same color pixels along the vertical direction through said segment electrodes, and for displaying different color pixels and supplying drive signals thereto, thereby forming segment electrode columns for the same color pixels and the different color pixels;

connection lines for connecting the segment electrode columns that display the same color pixels, which columns are positioned adjacent to each other in the vertical direction, and forming individual pairs of adjoining segment electrode columns that sandwich segment electrode columns which display different color pixels among the segment electrode columns connected by said signal lines, said pairs of segment electrode columns being arranged to be simultaneously energized via said connection lines and said signal lines;

a common-electrode drive circuit for driving said plurality of common electrodes in response to said common-electrode drive signal said sync signal derived from said television signal processing circuit; and a segment-electrode drive circuit for driving said plurality of segment electrodes in response to said segment-electrode drive signal and said sync signal derived from said television signal processing circuit;

wherein each of the segment electrode columns that display the same color pixels are connected at their end portions by said connection lines, and are arranged in a repeated form by combining a pair of connected segment electrode columns that sandwich two segment electrode columns which display two different color pixels, and two connected pairs of segment electrode columns that sandwich one segment electrode column which displays pixels of another different color.

24. A color liquid crystal display type television apparatus, comprising:

a television signal receiving unit for receiving a desired television signal;

a television signal processing unit for processing said desired television signal to produce a video signal, a common-electrode drive signal, a segment-electrode drive signal, and a sync signal;

a matrix type color liquid crystal display device for displaying a color television image in response to said video signal, including:

a plurality of stripe-shape common electrodes having a long edge extending along a horizontal direction, and also a short edge extending along a vertical direction perpendicular to the horizontal direction;

a plurality of substantially square-shape segment electrodes for displaying at least three different color pixels, positioned opposite to said plurality of stripe-shaped common electrodes so as to form a matrix pattern, a width of each of said segment electrodes along the vertical direction being equal to approximately one half that of said short edge of each of said common electrodes, and said segment electrodes being aligned along first and second lines that are positioned parallel to each other along the horizontal direction with respect to each of said common electrodes, wherein said segment electrodes arranged in said first line are positioned shifted by a predetermined positional shift amount with respect to the segment electrodes arranged in said line, and wherein segment electrodes for displaying the same color pixels are aligned along the vertical direction;

signal lines connected to said segment electrodes for selectively displaying the same color pixels along the vertical direction through said segment electrodes, and for displaying different color pixels and supplying drive signals thereto, thereby forming segment electrode columns for the same color pixels and the different color pixels;

connection lines for connecting the segment electrode columns that display the same color pixels, which columns are positioned adjacent to each other in the vertical direction, and forming individual pairs of adjoining segment electrode columns that sandwich segment electrode columns which display different color pixels among the segment electrode columns connected by said signal lines, said pair of segment electrode columns being arranged to be simultaneously energized via said connection lines and said signal lines;

a common-electrode drive circuit for driving said plurality of common electrodes in response to said common-electrode drive signal and said sync signal derived from said television signal processing circuit; and a segment-electrode drive circuit for driving said plurality of segment electrodes in response to said segment-electrode drive signal and said sync signal derived from said television signal processing circuit;

wherein each of said individual pairs of segment electrode columns that display the same color pixels are connected at their end portions by said connection lines, and are constructed by combining a connected pair of said electrode columns that sandwich one segment electrode column having pixels of a different color, another connected pair of electrode columns that sandwich two segment electrode columns having pixels of colors different from one another, and another connected pair of electrode columns that sandwich three segment electrode columns having pixels of colors different from neighboring segment electrode columns.

25. A color liquid crystal display type television apparatus, comprising:

a television signal receiving unit for receiving a desired television signal;

a television signal processing unit for processing said desired television signal to produce a video signal, a common-electrode drive signal, a segment-electrode drive signal, and a sync signal;

a matrix type color liquid crystal display device for displaying a color television image in response to said video signal, including:

a plurality of stripe-shaped common electrodes having a long edge extending along a horizontal direction, and also a short edge extending along a vertical direction perpendicular to the horizontal direction;

a plurality of substantially square-shaped segment electrodes for displaying at least three different color pixels, positioned opposite to said plurality of stripe-shaped common electrodes so as to form a matrix pattern, a width of each of said segment electrodes along the vertical direction being equal to approximately one half that of said short edge of each of said common electrodes, and said segment electrodes being aligned along first and second lines that are positioned parallel to each other along the horizontal direction with respect to each of said common electrodes, wherein said segment electrodes arranged in said first line are positionally shifted by a predetermined positional shift amount with respect to the segment electrodes arranged in said second line, and wherein segment electrodes for displaying the same color pixels are aligned along the vertical direction;

signal lines connected to said segment electrodes for selectively displaying the same color pixels along the vertical direction through said segment electrodes, and for displaying different color pixels and supplying drive signals thereto, thereby forming segment electrode columns for the same color pixels and the different color pixels;

connection lines for connecting the segment electrode columns that display the same color pixels, which columns are positioned adjacent to each other in the vertical direction, and forming individual pairs of adjoining segment electrode columns that sandwich segment electrode columns which display different color pixels among the segment electrode columns connected by said signal lines, said pairs of segment electrode columns being arranged to be simultaneously energized via said connection lines and said signal lines;

a common-electrode drive circuit for driving said plurality of common electrodes in response to said common-electrode drive signal and said sync signal derived from said television signal processing circuit; and a segment-electrode drive circuit for driving said plurality of segment electrodes in response to said segment-electrode drive signal and said sync signal derived from said television signal processing circuit;

wherein each of said individual pairs of segment electrode columns that display the same color pixels are connected at their end portions by said connection lines, and are arranged in a repeated form by combining: one connected pair of segment electrode columns that sandwich one segment electrode column displaying a different color pixel among three segment electrode columns, two columns of which display the same color pixels and are not juxtaposed to one another; one connected pair of segment electrode columns that sandwich two segment electrode columns displaying pixels of colors different from one another; and one connected pair of segment electrode columns that sandwich one segment electrode column displaying pixels of another different color.

* * * * *